(12) United States Patent
Kitazato et al.

(10) Patent No.: US 8,897,300 B2
(45) Date of Patent: Nov. 25, 2014

(54) TRANSMITTING APPARATUS, TRANSMITTING METHOD, RECEIVING APPARATUS, AND RECEIVING METHOD

(75) Inventors: Naohisa Kitazato, Tokyo (JP); Izumi Hatakeyama, Tokyo (JP); Masayuki Obayashi, Kanagawa (JP)

(73) Assignee: Sony Corporation, Tokyo (JP)

( * ) Notice: Subject to any disclaimer, the term of this patent is extended or adjusted under 35 U.S.C. 154(b) by 147 days.

(21) Appl. No.: 13/266,849

(22) PCT Filed: May 13, 2010

(86) PCT No.: PCT/JP2010/058079
§ 371 (c)(1),
(2), (4) Date: Oct. 28, 2011

(87) PCT Pub. No.: WO2010/131693
PCT Pub. Date: Nov. 18, 2010

(65) Prior Publication Data
US 2012/0051360 A1    Mar. 1, 2012

(30) Foreign Application Priority Data
May 13, 2009 (JP) ................................ 2009-116100

(51) Int. Cl.
*H04N 21/435* (2011.01)
*H04H 60/23* (2008.01)
(Continued)

(52) U.S. Cl.
CPC ............ *H04N 21/435* (2013.01); *H04H 60/23* (2013.01); *H04N 21/235* (2013.01); *H04N 21/4345* (2013.01); *H04H 20/61* (2013.01); *H04N 21/26606* (2013.01); *H04N 7/163* (2013.01)
USPC ............................................ 370/390; 725/54

(58) Field of Classification Search
CPC ............................. H04N 21/63; H04N 7/162
USPC ......................................................... 370/390
See application file for complete search history.

(56) References Cited

U.S. PATENT DOCUMENTS

2002/0056140 A1* 5/2002 Oishi et al. ..................... 725/148
2004/0031058 A1* 2/2004 Reisman ......................... 725/112
(Continued)

FOREIGN PATENT DOCUMENTS

| | | |
|---|---|---|
| JP | 2003 032659 | 1/2003 |
| JP | 2006 041981 | 2/2006 |

(Continued)

OTHER PUBLICATIONS

U.S. Appl. No. 13/075,440, filed Mar. 30, 2011, Yamagishi, et al.

(Continued)

*Primary Examiner* — Jefferey Harold
*Assistant Examiner* — Justin Sanders
(74) *Attorney, Agent, or Firm* — Oblon, Spivak, McClelland, Maier & Neustadt, L.L.P.

(57) ABSTRACT

The present invention relates to a transmitting apparatus and transmitting method as well as a receiving apparatus and receiving method configured to be able to recognize only channel selection information for viewable digital broadcasting at the receiving end.
A community broadcasting station 32 transmits community broadcasting which includes an additional information descriptor and the content of the community broadcasting. The additional information descriptor is for identifying channel selection information, which is information related to channel selection of community broadcasting that is reception-restricted, and which includes tuning information, a service ID, a service name, and a service type, etc. The present invention may be applied to a server that communicates with a receiving terminal which receives digital broadcasting, for example.

15 Claims, 18 Drawing Sheets

(51) Int. Cl.
*H04N 21/235* (2011.01)
*H04N 21/434* (2011.01)
*H04H 20/61* (2008.01)
*H04N 21/266* (2011.01)
*H04N 7/16* (2011.01)

(56) References Cited

U.S. PATENT DOCUMENTS

2005/0160453 A1* 7/2005 Kim .................................. 725/39
2006/0242692 A1* 10/2006 Thione et al. ..................... 726/9
2008/0170593 A1* 7/2008 Lee ................................. 370/503
2009/0031373 A1* 1/2009 Hogyoku ....................... 725/104
2009/0249385 A1* 10/2009 Jeong ............................. 725/27

FOREIGN PATENT DOCUMENTS

JP 2007 329847 12/2007
JP 2009 033411 2/2009

OTHER PUBLICATIONS

U.S. Appl. No. 13/081,566, filed Apr. 7, 2011, Kitazato, et al.
U.S. Appl. No. 13/071,559, filed Mar. 25, 2011, Yamagishi, et al.
U.S. Appl. No. 13/318,896, filed Nov. 4, 2011, Kitazato, et al.
International Search Report Issued Jun. 8, 2010 in PCT/JP10/058079 Filed May 13, 2010.

* cited by examiner

FIG. 6

```
NIT_Additional_Information_descriptor () {
  descriptor_tag                          8
  descriptor_length                       8
  additionalr_information_type            8
   if (additional_information_type==1) {
     PCR_PID
     }                                   16
  if (additional_information_type==2) {
    Additional_information_server_URL ()  8×N
      }
    }
```

| LICENSE ID | LICENSE EXPIRATION DATE | SCRAMBLE KEY |

TRANSMITTING APPARATUS, TRANSMITTING METHOD, RECEIVING APPARATUS, AND RECEIVING METHOD

TECHNICAL FIELD

The present invention relates to a transmitting apparatus and transmitting method, as well as to a receiving apparatus and receiving method, and more particularly relates to a transmitting apparatus and transmitting method as well as a receiving apparatus and receiving method configured to be able to recognize only channel selection information for viewable digital broadcasting at the receiving end.

BACKGROUND ART

In recent years, digital terrestrial broadcasting in the UHF (Ultra High Frequency) band is being carried out. The physical channels of digital terrestrial broadcasting are divided into plural segments (13 segments for digital terrestrial broadcasting in Japan). Of these, broadcasting intended for mobile terminals (hereinafter called 1seg) is conducted in the band for one segment. Additionally, broadcasting intended for stationary terminals such as television receivers, etc. is conducted in the bands for the remaining 12 segments (see PTL 1, for example).

With digital terrestrial broadcasting, in practice there exist many empty channels other than the channels over which digital terrestrial broadcasting is conducted in respective regions among the channels 13 to 52 in the UHF band. For this reason, methods of effectively utilizing such empty channels are being investigated.

One promising method that effectively utilizes empty channels is a method that conducts multi-channel community broadcasting over empty channels. Herein, multi-channel community broadcasting is broadcasting in one-segment units multilaterally conducted by utilizing a plurality of logical channels in a limited region. The one segment referred to herein is of a plurally divided band for a single digital terrestrial broadcasting channel. Hereinafter, multi-channel community broadcasting will be simply referred to as community broadcasting.

Meanwhile, with digital terrestrial broadcasting intended for stationary terminals, it is possible to apply reception restrictions by using a CAS (Conditional Access System) format. Meanwhile, although a CAS format is not being used for 1seg broadcasting, it is anticipated that a CAS format similar to that of broadcasting intended for stationary terminals will be adopted in the case where reception restrictions become necessary. Thus, hereinafter, such a case will be explained.

FIG. 1 is a diagram explaining a CAS format for 1seg broadcasting.

NIT is a table containing information regarding frequency information for individual broadcasting services in order to tune the carrier upon which specific broadcasting services are transmitted, and corresponding services. More specifically, as illustrated in FIG. 1, a reception-restricted 1seg broadcasting NIT (Network Information Table) is composed of the network ID (NID) for the 1seg broadcasting, tuning information indicating the frequency, and a service list of broadcasting services, etc. Herein, the network ID is an ID unique to the network. The service list is composed of a service ID (ServiceID) and a service type (ServiceType) for a broadcasting service, etc. The service ID is an ID unique to a broadcasting service, while the service type is the type of broadcasting service (television broadcast, radio broadcast, etc.).

A receiving terminal that receives 1seg broadcasting acquires a service ID from this NIT, and acquires a PMT (Program Map Table) corresponding to that service ID. Herein, a PMT is information that manages the content constituting a broadcasting service. More specifically, as illustrated in FIG. 1, a PMT is composed of a service ID, a PCR_PID, ES information on ESs (Elementary Streams) constituting the broadcasting service for 1seg broadcasting corresponding to that service ID, and 1seg CAS information, which is CAS information for that broadcasting service, etc.

The PCR_PID is an ID unique to a PCR (Program Clock Reference) packet (hereinafter called a packet ID). Also, ES information (Elementary stream information) is composed of an ES_PID, which is the packet ID for an ES (Elementary stream), and an ES_type, which is the type of the ES, etc. 1seg CAS information is composed of a CAS format and an ECM_PID, which is the packet ID for ECM (Entitlement Control Message) packet, etc. An ECM packet is a packet of information shared by all users and including an encrypted scramble key as information related to the scramble key used by that CAS format. Herein, a key for decrypting the encrypted scramble key is included in an EMM (Entitlement Management Message) packet, which is a packet of information individual to each user.

EMM packets are encrypted and included in a digital terrestrial broadcast. An EMM packet can be acquired by decrypting using a key included in an IC (Integrated Circuit) card, etc. issued as a result of the user of a receiving terminal conducting registration for receiving reception-restricted broadcasting (hereinafter called reception registration).

Consequently, the user of a receiving terminal first conducts reception registration and acquires an IC card, etc. that includes a key for unlocking the encryption on an EMM packet. Then, the user uses that IC card to cause the receiving terminal to acquire an EMM packet. The receiving terminal unlocks the scrambling of the encrypted scramble key included in an ECM with the key included in that EMM packet. Using the scramble key obtained as a result, the scrambling of the 1seg broadcasting ESs corresponding to ES information included in a PMT is unlocked. As a result, the video and audio of reception-restricted 1seg broadcasting can be played back.

CITATION LIST

Patent Literature

PTL 1: Japanese Unexamined Patent Application Publication No. 2007-329847

SUMMARY OF INVENTION

Technical Problem

As above, with a conventional CAS format, since the frequency, etc. of reception-restricted digital terrestrial broadcasting is stated in the NIT, unviewable digital terrestrial broadcasting with reception restrictions is recognized in a receiving terminal that is not compatible with digital terrestrial broadcasting with reception restrictions.

The present invention, being devised in light of such circumstances, is configured to be able to recognize only channel selection information for viewable digital broadcasting at the receiving end.

Solution to Problem

A transmitting apparatus of a first aspect of the present invention is a transmitting apparatus comprising generating means for generating, in a data structure for transmission, channel selection information which is information related to channel selection of digital broadcasting that is not reception-restricted, and identification information for identifying channel selection information for digital broadcasting that is reception-restricted, and transmitting means for transmitting the digital broadcasting content, the channel selection information, and the identification information.

A transmitting method of a first aspect of the present invention is a transmitting method that includes a generating step wherein a transmitting apparatus generates, in a data structure for transmission, channel selection information which is information related to channel selection of digital broadcasting that is not reception-restricted, and identification information for identifying channel selection information for digital broadcasting that is reception-restricted, and a transmitting step wherein the transmitting apparatus transmits digital broadcasting content, the channel selection information, and the identification information.

In a first aspect of the present invention, channel selection information which is information related to channel selection of digital broadcasting that is not reception-restricted and identification information for identifying channel selection information for digital broadcasting that is reception-restricted are generated in a data structure for transmission, and digital broadcasting content, channel selection information, and identification information are transmitted.

A receiving apparatus of a second aspect of the present invention is a receiving apparatus comprising receiving means for receiving digital broadcasting that includes channel selection information which is information related to channel selection of digital broadcasting that is not reception-restricted, identification information for identifying channel selection information for digital broadcasting that is reception-restricted, and the content of the digital broadcasting, channel selecting means for selecting the digital broadcasting, and controlling means for acquiring the channel selection information for the reception-restricted digital broadcasting on the basis of the identification information, and controlling channel selection of the reception-restricted digital broadcasting on the basis of that channel selection information.

A receiving method of a second aspect of the present invention is a receiving method that includes a receiving step wherein a receiving apparatus receives digital broadcasting that includes channel selection information which is information related to channel selection of digital broadcasting that is not reception-restricted, identification information for identifying channel selection information for digital broadcasting that is reception-restricted, and the content of the digital broadcasting, a channel selecting step wherein the receiving apparatus selects the digital broadcasting, and a controlling step wherein the receiving apparatus acquires the channel selection information for the reception-restricted digital broadcasting on the basis of the identification information, and controls channel selection of the reception-restricted digital broadcasting on the basis of that channel selection information.

In a second aspect of the present invention, in the case where digital broadcasting that includes channel selection information which is information related to channel selection of digital broadcasting that is not reception-restricted, identification information for identifying channel selection information for digital broadcasting that is reception-restricted, and the content of the digital broadcasting that is selected, channel selection information for reception-restricted digital broadcasting is acquired on the basis of identification information, and channel selection of reception-restricted digital broadcasting is controlled on the basis of that channel selection information.

Advantageous Effects of Invention

As above, according to the present invention, only channel selection information for viewable digital terrestrial broadcasting can be recognized at the receiving end.

BRIEF DESCRIPTION OF DRAWINGS

FIG. 6 is a diagram illustrating an exemplary configuration of an additional information descriptor.

DESCRIPTION OF EMBODIMENTS

<Embodiments>
[Exemplary Configuration of Embodiment of Transmitting/Receiving System]

Figure 1:
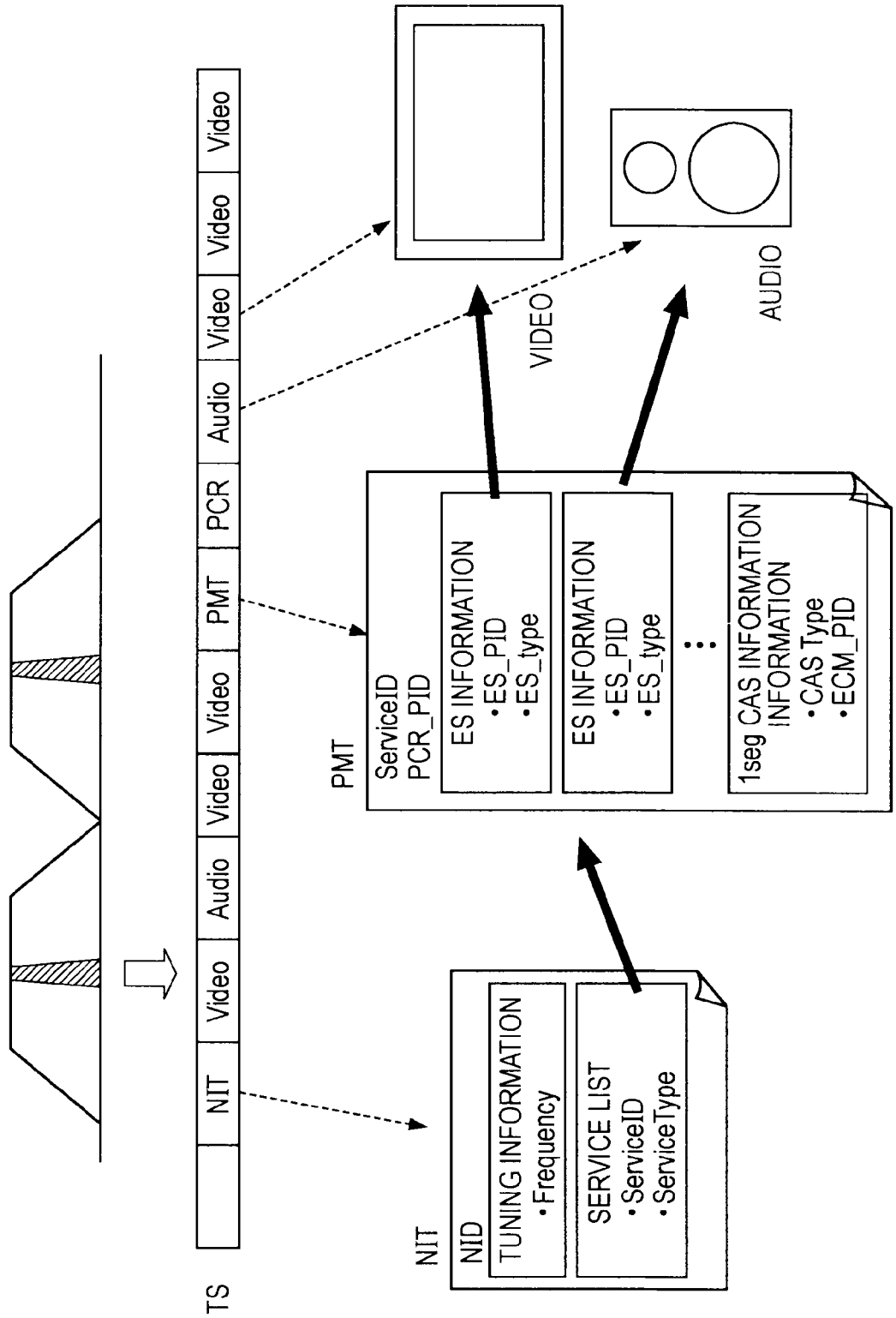
FIG. 1 is a diagram explaining a 1seg broadcasting CAS format.
Figure 2:
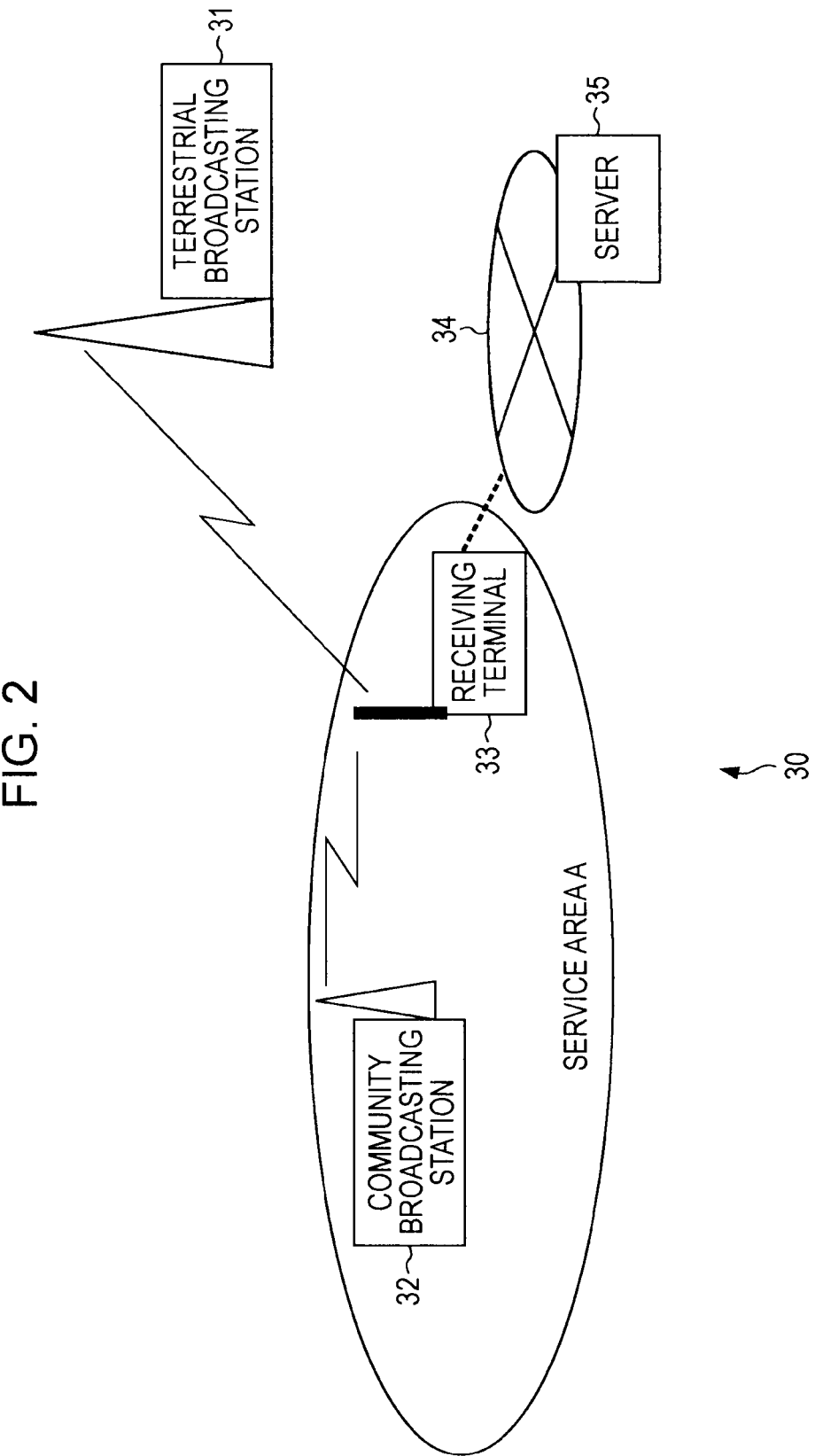
FIG. 2 is a diagram illustrating an exemplary configuration of an embodiment of a signal transmitting/receiving system to which the present invention has been applied.

FIG. 2 is a diagram illustrating an exemplary configuration of an embodiment of a transmitting/receiving system to which the present invention has been applied.

The transmitting/receiving system 30 in FIG. 2 is composed of a terrestrial broadcasting station 31, a community broadcasting station 32, a receiving terminal 33, a network 34, and a server 35.

The terrestrial broadcasting station 31 conducts digital terrestrial broadcasting including free 1seg broadcasting on a digital terrestrial broadcast wave. The community broadcasting station 32 conducts pay community broadcasting receivable only in a service area A in the central segment of an empty channel on a digital terrestrial broadcast wave. This pay community broadcasting is reception-restricted by a licensing format, which is a given CAS format.

The receiving terminal 33 is a mobile terminal able to receive free 1seg broadcasting or pay community broadcasting transmitted in the central segment of a digital terrestrial broadcast wave. Consequently, as illustrated in FIG. 2, in the case where a user possessing a receiving terminal 33 is in the service area A, the receiving terminal 33 is able to receive pay community broadcasting from the community broadcasting station 32 and free 1seg broadcasting.

Also, the receiving terminal 33 wirelessly communicates with the server 35 via the network 34. For example, in the case where a terminal authorized for Wi-Fi is used as the receiving terminal 33, the receiving terminal 33 wirelessly communicates with the server 35 in conformity to IEEE (Institute of Electrical and Electronic Engineers) 802.11. Herein, the receiving terminal 33 may also wirelessly communicate with the server 35 by taking a mobile phone network as the network 34.

The receiving terminal 33, by wirelessly communicating with the server 35, acquires from the server 35 a scramble key for unlocking scrambling applied to content, which is the video data and audio data of pay community broadcasting, etc.

The server 35 wirelessly communicates with the receiving terminal 33 via the network 34 and authenticates the receiving terminal 33. Also, the server 35 transmits a scramble key for pay community broadcasting broadcasted by the community broadcasting station 32 to a valid receiving terminal 33 via the network 34. Additionally, the server 35 conducts a payment process with respect to the receiving terminal 33 for pay community broadcasting corresponding a scramble key transmitted to the receiving terminal 33. This network 34 may also used wired communication rather than just wireless communication. Also, while IP (Internet Protocol) may be used for the transmission protocol, a network using another transmission protocol is also acceptable.

As an example of a transmitting/receiving system 30 configured as above, it is conceivable for the community broadcasting station 32 to take an exhibition hall and its surroundings as the service area A, and conduct live broadcasting of pay seminars being conducted in that exhibition hall as the community broadcasting.

In this case, the receiving terminal 33, by receiving pay community broadcasting in the service area A, recognizes the existence of that pay community broadcasting. Then, the receiving terminal 33 causes the server 35 to conduct a payment process and acquires a scramble key according to commands from the user. In so doing, the user of the receiving terminal 33 is able to view pay community broadcasting. Meanwhile, it may also be configured such that the community broadcasting station 32 transmits free community broadcasting introducing highlights of the exhibition hall, etc. together with pay community broadcasting.

[Explanation of Licensing Format]

Figure 3:
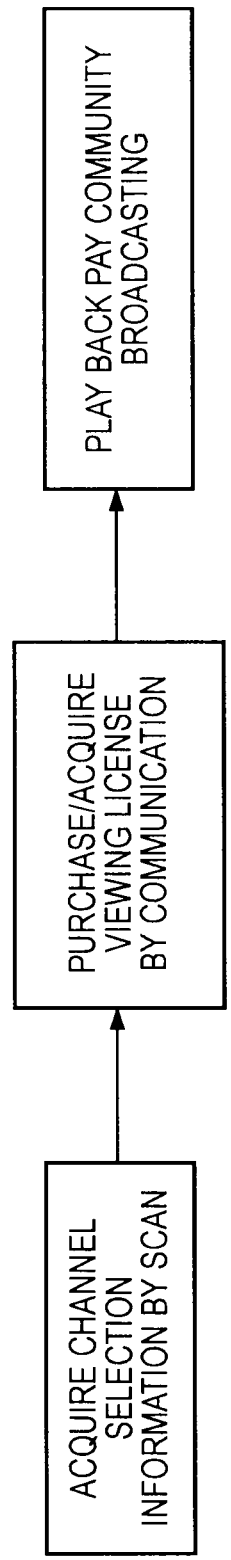
FIG. 3 is a diagram explaining a licensing format.

FIG. 3 is a diagram explaining a licensing format.

As illustrated in FIG. 3, with a licensing format, the receiving terminal 33 acquires channel selection information, which is information related to pay community broadcasting channel selection, by scanning the central segment of a digital terrestrial broadcasting wave.

Then, the receiving terminal 33, by wirelessly communicating with the server 35, purchases and acquires a viewing license that includes information such as a scramble key required to play back community broadcasting specified by the user from among the pay community broadcasting corresponding to the acquired channel selection information. Then, the receiving terminal 33 uses the viewing license to play back pay community broadcasting.

[Detailed Exemplary Configuration of Receiving Terminal]

Figure 4:
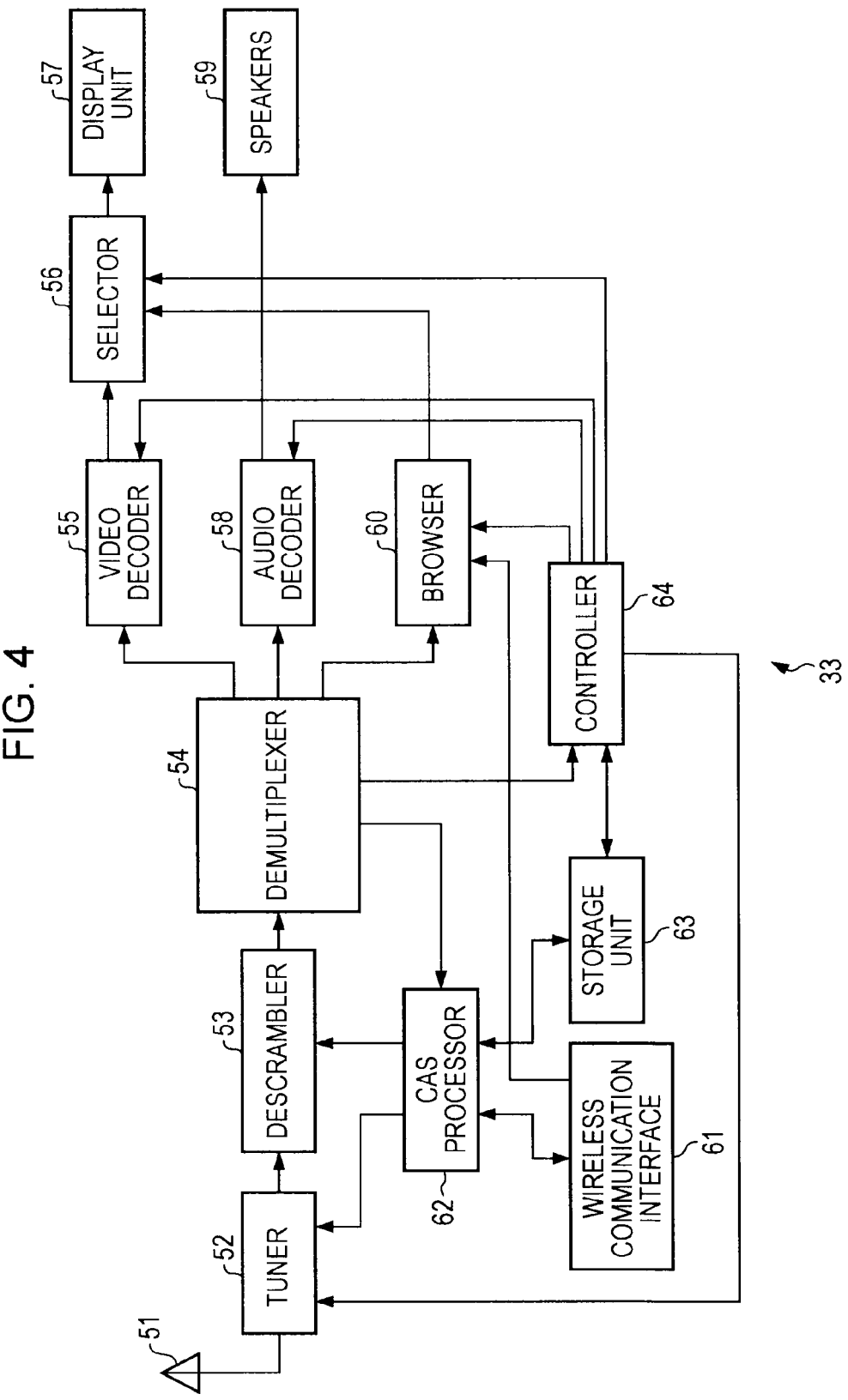
FIG. 4 is a block diagram illustrating a detailed exemplary configuration of the receiving terminal in FIG. 2.

FIG. 4 is a block diagram illustrating a detailed exemplary configuration of the receiving terminal 33 in FIG. 2.

The receiving terminal 33 in FIG. 4 is composed of an antenna 51, a tuner 52, a descrambler 53, a demultiplexer 54, a video decoder 55, a selector 56, a display unit 57, an audio decoder 58, speakers 59, a browser 60, a wireless communication interface 61, a CAS processor 62, a storage unit 63, and a controller 64.

The tuner 52 selects a channel on the basis of tuning information supplied from the controller 64, and sequentially receives the TS (Transport Stream) in the central segment of a digital terrestrial broadcast wave via the antenna 51. In other words, the tuner 52 scans the TS in the central segment of a digital terrestrial broadcast wave.

Also, the tuner 52 selects a channel on the basis of tuning information supplied from the controller 64, and receives a 1seg broadcasting TS on a given logical channel from the terrestrial broadcasting station 31 via the antenna 51. Additionally, the tuner 52 selects a channel on the basis of tuning information supplied from the CAS processor 62, and receives a community broadcasting TS on a given logical channel from the community broadcasting station 32 via the antenna 51. The tuner 52 supplies a received TS to the descrambler 53.

The descrambler 53 uses a scramble key supplied from the CAS processor 62 to unlock scrambling applied to a TS supplied from the tuner 52, and supplies the result to the demultiplexer 54.

The demultiplexer 54 separates a TS supplied from the descrambler 53 into respective information such as video data, audio data, information for displaying using a browser during broadcasting (hereinafter called display control information), and PSI (Program Specific Information). Herein, PSI is a collective term for a table that includes information for receiving broadcasting services such as the NIT, PMT, and PAT (Program Association Table), frequency information, and information specifying packets corresponding to a broadcasting services, etc. The PSI is control information for the system. The demultiplexer 54 supplies video data to the video decoder 55 and supplies audio data to the audio decoder 58. Also, the demultiplexer 54 supplies display control information to the browser 60, and supplies the respective information, etc. of the PSI to the controller 64 and the CAS processor 62.

The video decoder 55, following control by the controller 64, decodes video data supplied from the demultiplexer 54 in a format corresponding to the encoding at the terrestrial broadcasting station 31 or the community broadcasting station 32, and supplies the result to the selector 56.

The selector 56, following control by the controller 64, selects video data supplied from the video decoder 55 or video data supplied from the browser 60, and supplies it to the display unit 57. The display unit 57 displays 1seg broadcasting or community broadcasting images, etc. on the basis of video data supplied from the selector 56.

The audio decoder 58, following control by the controller 64, decodes audio data supplied from the demultiplexer 54 in a format corresponding to the encoding at the terrestrial broadcasting station 31 or the community broadcasting station 32, and supplies the result to the speakers 59. The speakers 59 output audio corresponding to audio data supplied from the audio decoder 58 as 1seg broadcasting or community broadcasting audio.

The browser 60 interprets display control information supplied from the demultiplexer 54, generates video data, and supplies it to the selector 56. Also, the browser 60 interprets HTML (Hypertext Markup Language) or BML (Broadcast Markup Language) documents supplied from the wireless communication interface, generates video data, and supplies it to the selector 56.

The wireless communication interface 61 wirelessly communicates with the server 35 via the network 34. For example, the wireless communication interface 61 transmits a terminal ID, which is an ID unique to a receiving terminal that is supplied from the CAS processor 62 and assigned to the receiving terminal 33, to the server 35 via the network 34. Also, the wireless communication interface 61 receives via the network 34 a viewing license transmitting as a result of an authentication process conducted by the server 35 using a terminal ID, and supplies it to the CAS processor 62.

Additionally, the wireless communication interface 61 receives via the network 34 an HTML or BML document for a given screen transmitted as a result of an authentication process conducted by the server 35 using a terminal ID, and supplies it to the browser 60.

The CAS processor 62 supplies the terminal ID of the receiving terminal 33 stored in the storage unit 63 to the wireless communication interface 61. Also, the CAS processor 62 supplies a viewing license supplied from the wireless communication interface 61 to the storage unit 63 and causes it to be stored.

Additionally, the CAS processor 62 registers tuning information, a service ID, a service name, a service type, etc. from among channel selection information included in a PCR packet of pay community broadcasting supplied from the demultiplexer 54 in a channel selection table, which is a table of channel selection information in the storage unit 63. Also, the CAS processor 62, on the basis of the channel selection table, controls channel selection by supplying the tuner 52 with tuning information for pay community broadcasting registered in that channel selection table. The CAS processor 62 supplies a scramble key stored in the storage unit 63 to the descrambler 53.

The storage unit 63 stores a terminal ID, a viewing license, a channel selection table, etc.

The controller 64 sequentially supplies the tuner 52 with tuning information for the central segment of each physical channel of a digital terrestrial broadcast wave. The controller 64 registers the tuning information, service ID, and service type included in the NIT of 1seg broadcasting and the service name, etc. included in the SDT (Service Description Table) supplied from the demultiplexer 54 as a result in the channel selection table in the storage unit 63. Herein, an SDT is a table containing meta information related to each broadcasting service (such as the service name, for example).

Also, the controller 64 supplies service names registered in a channel selection table stored in the storage unit 63 to the browser 60 and causes a list of those service names (hereinafter called a service list) to be displayed by the display unit 57 according to commands from a user. The user views the service list displayed by the display unit 57 and issues instructions selecting the service name of a viewing target broadcasting service from among the service names listed in the service list. The controller 64, on the basis of the selection instructions, reads out tuning information corresponding to the viewing target service name from the channel selection table, and supplies it to the tuner 52.

Additionally, the controller 64 controls the video decoder 55, the selector 56, the audio decoder 58, and the browser 60 on the basis of respective information in the PSI supplied from the demultiplexer 54. More specifically, the controller 64 controls the video decoder 55 and the audio decoder 58 to synchronize video data output from the video decoder 55 with audio data output from the audio decoder 58, for example.

[Explanation of Pay Community Broadcasting Playback Method]

Figure 5:
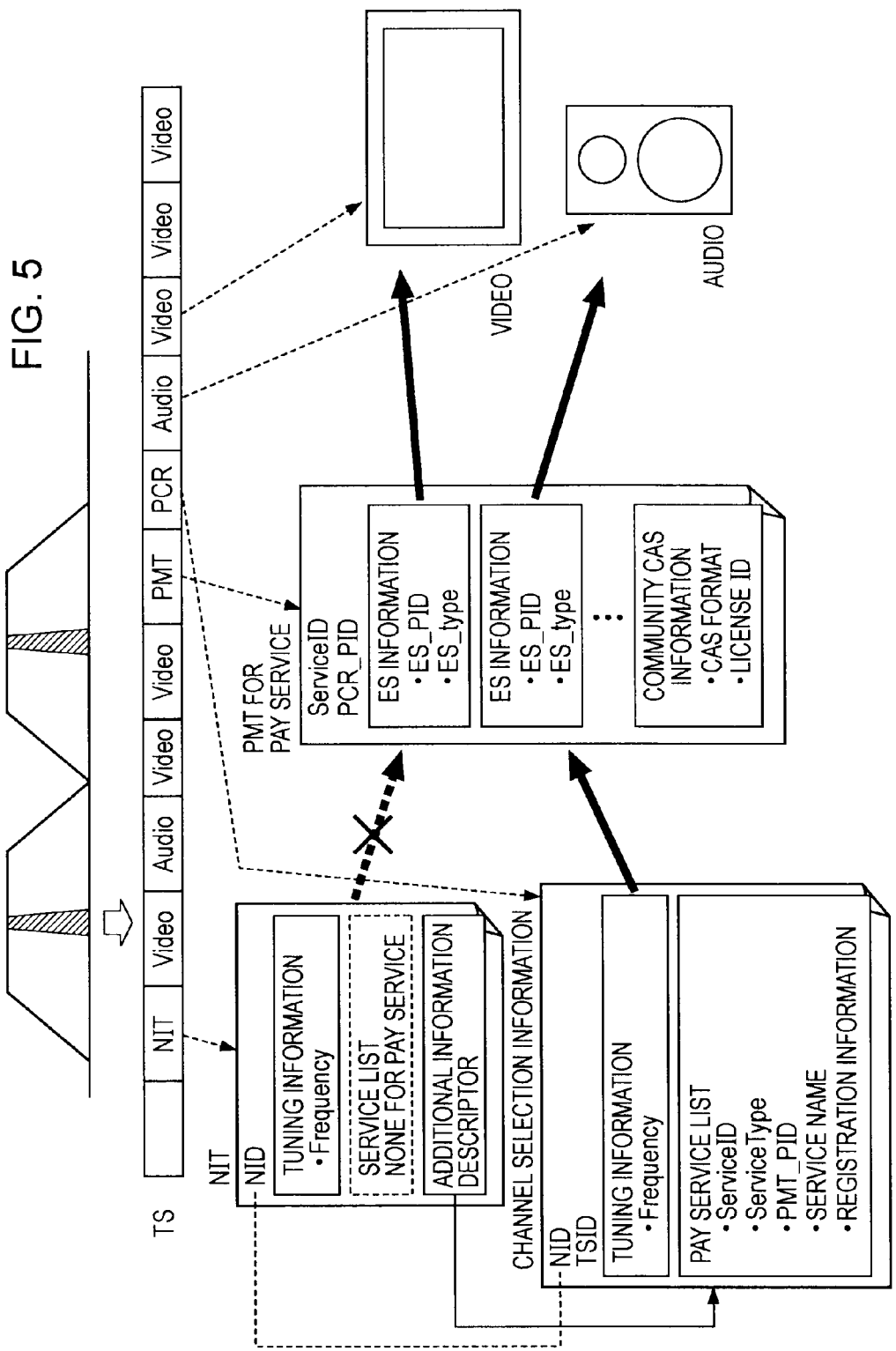
FIG. 5 is a diagram explaining a pay community broadcasting playback method.

FIG. 5 is a diagram explaining a pay community broadcasting playback method conducted by a receiving terminal 33.

As illustrated in FIG. 5, a network ID, tuning information, and an additional information descriptor, etc. are stated in an NIT for pay community broadcasting. The additional information descriptor is a descriptor related to acquisition of pay community broadcasting channel selection information. A service list is not stated in the NIT.

In this way, since an additional information descriptor is stated in the NIT, the receiving terminal 33 is able to identify a PCR packet containing pay community broadcasting channel selection information on the basis of that additional information descriptor, and acquire channel selection information from that PCR packet. As illustrated in FIG. 5, this channel selection information is composed of a network ID, a TSID which is an ID unique to a TS, a pay service list, and registration information, etc. for pay community broadcasting.

The pay service list is composed of a service ID, a service type, a PMT packet ID, a service name, and registration information. The registration information is information related to registration for receiving pay community broadcasting, and is composed of a registration type and the URL (Uniform Resource Locator) of the server 35.

Regarding registration types, there are for example two types that differ in the timing when a viewing license is acquired. The first type is a type that acquires a viewing license from the server 35 according to user instructions after causing the server 35 to conduct a payment process as a registration process. The second type is a type that causes the server 35 to conduct a payment process as a registration process while also causing it to transmit a viewing license at the same time.

Upon acquiring channel selection information, the receiving terminal 33 registers the tuning information, service IDs, service types, service names, etc. included in that channel selection information in a channel selection table.

Then, the receiving terminal 33 displays a service list of the service names registered in the channel selection table on the display unit 57, and receives a user's selection instructions corresponding to the service list being displayed on the display unit 57. Upon receiving the user's selection instructions, the receiving terminal 33 wirelessly communicates with the server 35 via the network 34 and acquires a viewing license for the pay community broadcasting corresponding to the selected service name.

Meanwhile, since the PMT packet ID is included in the channel selection information, the receiving terminal 33 is able to recognize a pay community broadcasting PMT. This PMT contains a service ID, a packet ID for a PCR packet, ES information for the ESs constituting the broadcasting service of the pay community broadcasting corresponding to that service ID, and community CAS information which is CAS information for that broadcasting service, etc. The community CAS information is composed of a CAS format and information related to the scramble key used by that CAS format, such as a license ID for a viewing license, etc.

Upon acquiring a viewing license, the receiving terminal 33 acquires the ESs of pay community broadcasting on the basis of the ES information included in the selected pay community broadcasting PMT. Then, the receiving terminal 33 unlocks the scrambling of those ESs with the scramble key corresponding to the license ID included in the PMT. As a result, the video and audio of pay community broadcasting is played back.

As above, since a scramble key is not included in a pay community broadcast, pay community broadcasting cannot be played back by simply receiving the pay community broadcasting. Consequently, it is possible to prevent an unauthorized receiving terminal that has not acquired a viewing license from playing back a pay community broadcast.

Also, a pay community broadcasting NIT is composed similarly to a 1seg broadcasting NIT, except that a service list is not stated and an additional information descriptor is stated. Consequently, in the case where an existing receiving terminal incompatible with pay community broadcasting receives a digital terrestrial broadcast wave of the present invention, it will ignore the additional information descriptor. Thus, the receiving terminal will simply be unable to recognize pay community broadcasting, and will not malfunction.

[Exemplary Configuration of Additional Information Descriptor]

FIG. 6 is a diagram illustrating an exemplary configuration of an additional information descriptor included in a pay community broadcasting NIT.

As illustrated in FIG. 6, an 8-bit descriptor tag (descriptor_tag), and 8-bit descriptor length (descriptor_length), and an 8-bit additional information type (additional_information_type) are arranged in the additional information descriptor. Also, a 16-bit packet ID for a PCR packet (PCR_PID) and an 8×N-bit server URL (Additional_information_server_URL) are arranged in the additional information descriptor. The additional information descriptor is stated in an area where information is stated for each network ID in the NIT, for example.

The additional information type is the acquisition location type for acquiring channel selection information for pay community broadcasting. The acquisition location for acquiring channel selection information for community broadcasting may be a pay community broadcasting PCR packet or an external apparatus such as the server 35, for example. Herein, the type that takes a pay community broadcasting PCR packet as the acquisition location is taken to be the first type, and the type that takes an external apparatus such as the server 35, etc. as the acquisition location is taken to be the second type. In the present embodiment, it is configured such that channel selection information is acquired from a pay community broadcasting PCR packet, and thus the additional information type is the first type.

In the case where the additional information type is the first type, the packet ID of the PCR packet acting as the acquisition location is stated in the packet ID for a PCR packet as information for identifying channel selection information. In the case where the additional information type is the second type, the URL of the external apparatus acting as the acquisition location is stated in the server URL as information for identifying channel selection information.

[Exemplary Configuration of Pay Community Broadcasting PCR Packet]

Figure 7:
FIG. 7 is a diagram illustrating an exemplary configuration of a PCR packet.

FIG. 7 is a diagram illustrating an exemplary configuration of a pay community broadcasting PCR packet.

As illustrated in FIG. 7, a TS header and an adaptation ield are stated in a pay community broadcasting PCR packet, followed by channel selection information in the payload.

The packet ID of the PCR packet is stated in the TS header. Time information (PCR) which acts as a reference for synchronizing the video and audio of pay community broadcasting during playback is stated in the adaptation field. This time information is used for synchronization control of the video decoder 55 and the audio decoder 58 by the controller 64.

Although redundant information is stated in the payload for ordinary digital broadcasting, channel selection information is stated for pay community broadcasting.

[Exemplary Arrangement of Community CAS Information]

Figure 8:
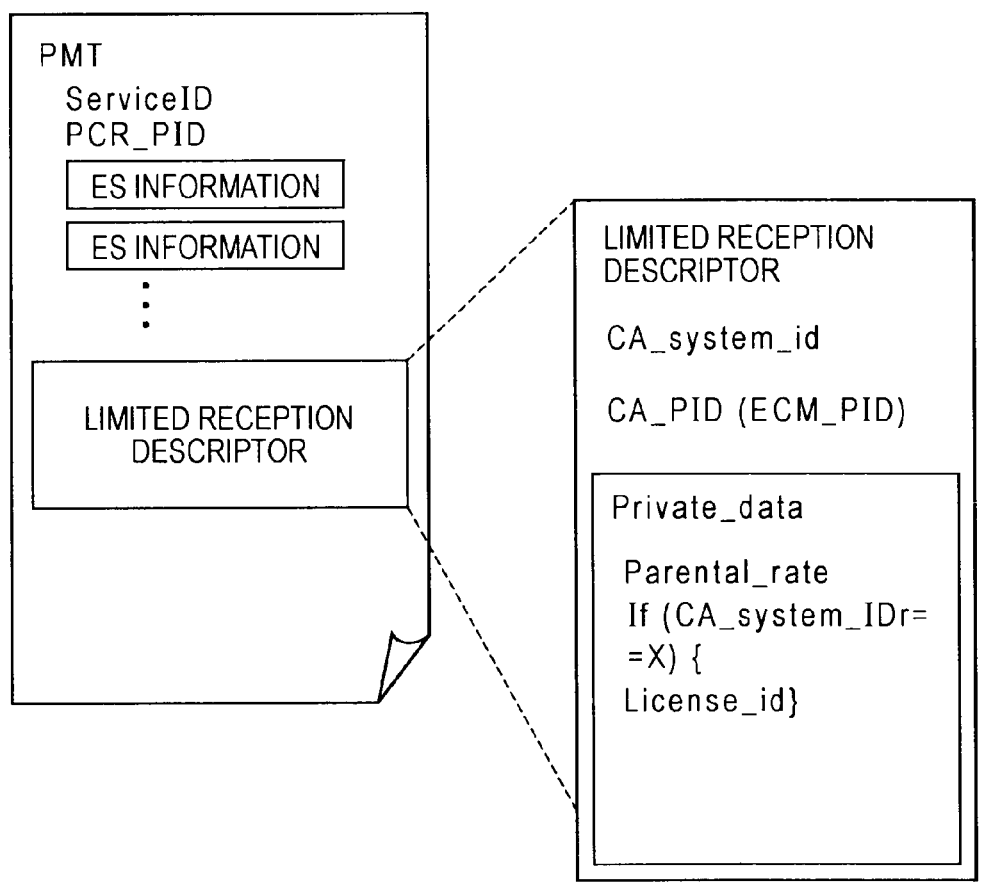
FIG. 8 is a diagram illustrating an exemplary arrangement of community CAS information.

FIG. 8 is a diagram illustrating an exemplary arrangement of community CAS information.

As illustrated in FIG. 8, community CAS information is stated in a limited reception descriptor arranged in a PMT, for example. A CAS format ID (CA_system_id), a CAS format packet ID (CA_PID), a private data area (Private_data), etc. are arranged in the limited reception descriptor.

The CAS format ID is an ID identifying a CAS format. In the case where the CAS format is a conventional CAS format, or in other words in the case where 1seg CAS information is stated in the limited reception descriptor, an ECM packet ID (ECM_PID) is stated as information related to a scramble key used in that CAS format as the CAS format packet ID. In the case where the CAS format is a licensing format, or in other words in the case where community CAS information is stated in the limited reception descriptor, nothing is stated as the CAS format packet ID. In the case where the CAS format is a licensing format, a license ID (License_id) is stated in the private data area.

As above, since a CAS format ID is arranged in the limited reception descriptor, it is possible to contemporaneously operate a conventional CAS format and a licensing format in the transmitting/receiving system 30.

Also, in the case where the CAS format is a licensing format, nothing is stated in the CAS format packet ID of the limited reception descriptor, and a license ID is stated in the private data area. Consequently, there is no significant bandwidth consumption of a digital terrestrial broadcast wave due to the CAS format being a licensing format.

[Explanation of Channel Selection Table Creation Method]

Figure 9:
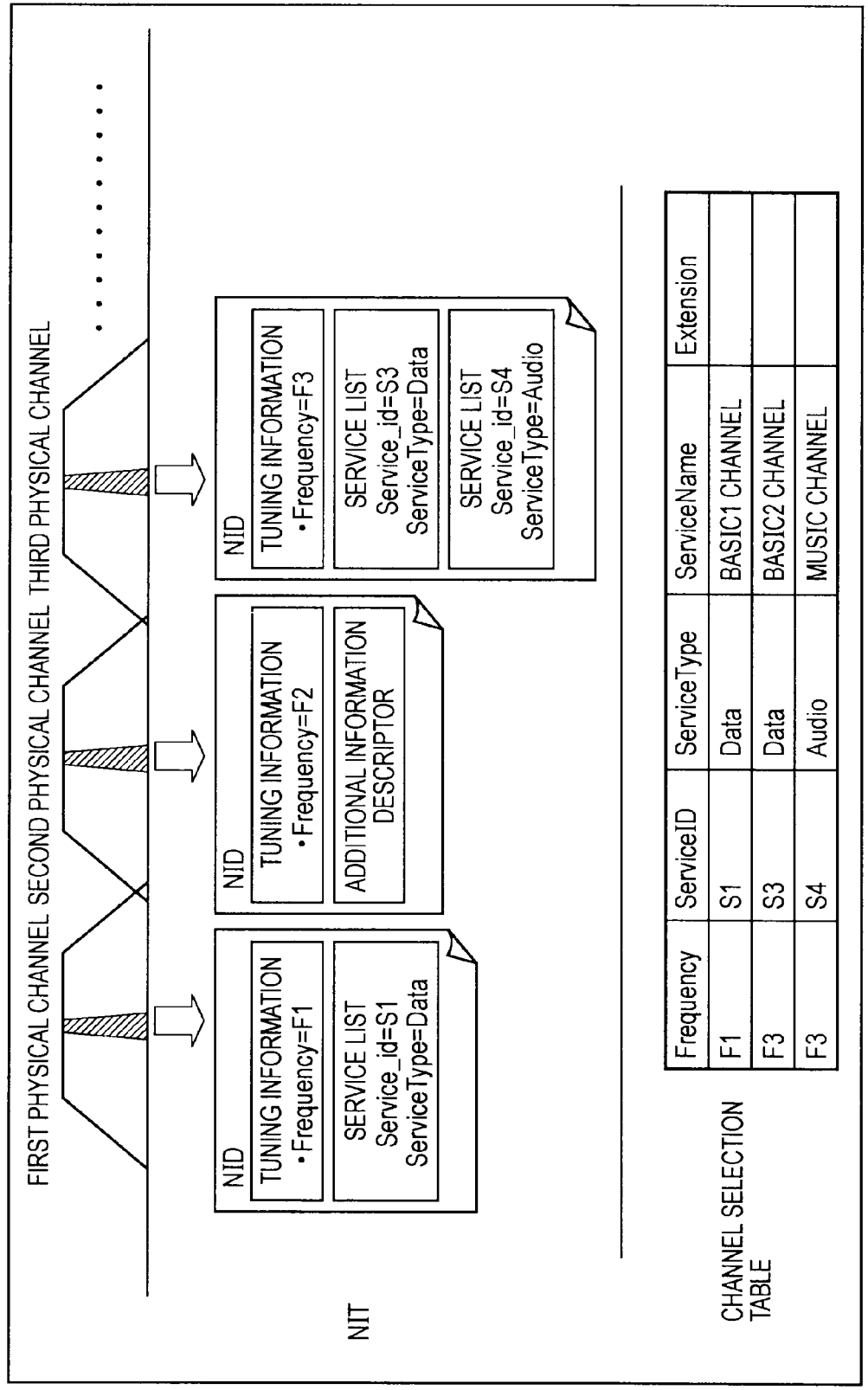
FIG. 9 is a diagram explaining a method of creating a channel selection table for an existing receiving terminal.
Figure 10:
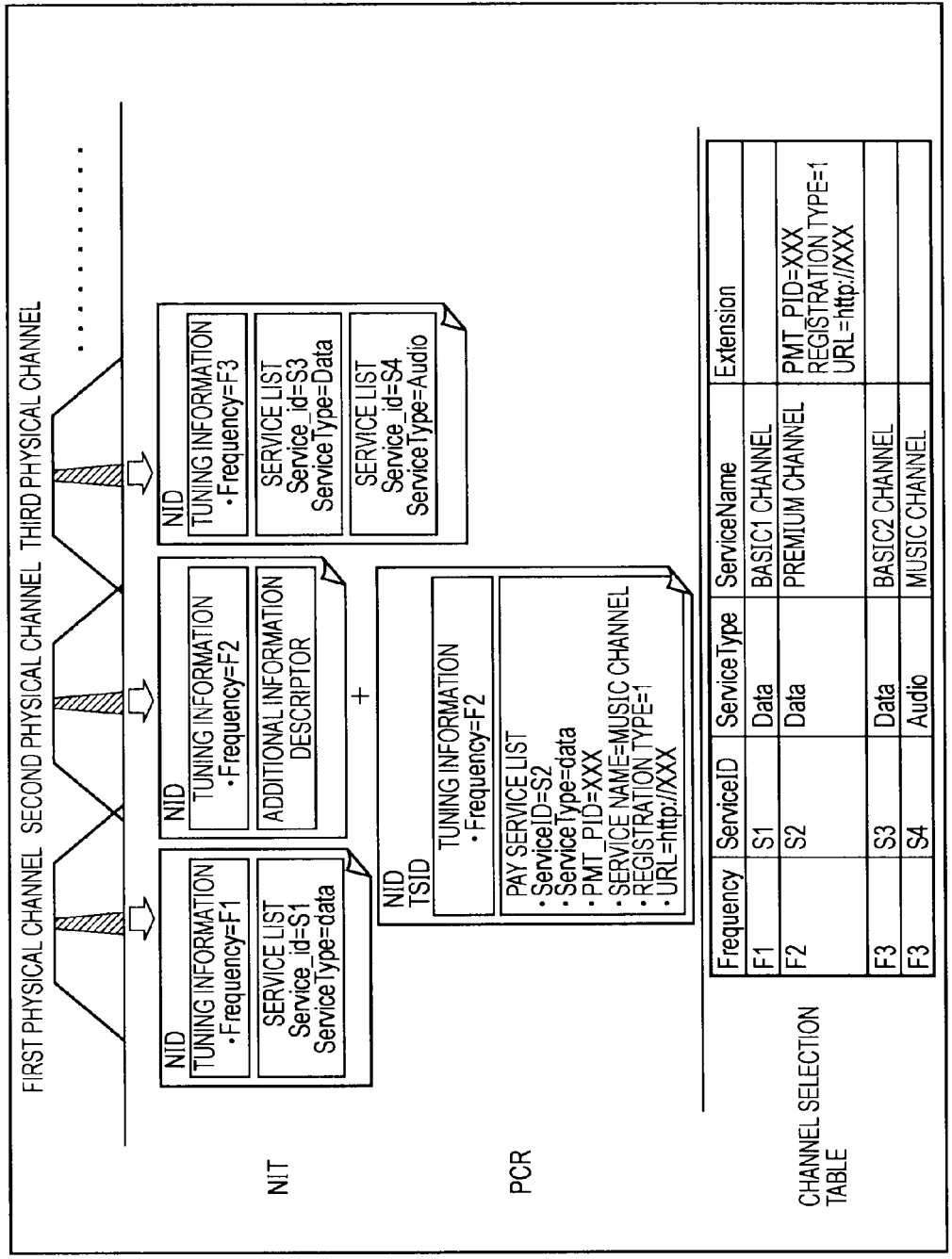
FIG. 10 is a diagram explaining a method of creating a channel selection table for a receiving terminal.

FIG. 9 is a diagram explaining a method of creating a channel selection table for an existing receiving terminal incompatible with pay community broadcasting that receives a digital terrestrial broadcast wave of the present invention. FIG. 10 is a diagram explaining a method of creating a channel selection table for a receiving terminal 33.

As illustrated in FIG. 9, an existing receiving terminal first selects the TSs in the central segments of each physical channel of a digital terrestrial broadcast wave and acquires the NITs included in those TSs.

More specifically, in the example in FIG. 9, free 1seg broadcasting is being conducted in the central segment of first and third physical channels, while pay community broadcasting is being conducted in the central segment of a second physical channel. Consequently, the existing receiving terminal acquires NITs containing the network IDs, tuning information, service lists, etc. for the 1seg broadcasts respectively assigned to the central segments from the TSs in the central segments of the first and third physical channels.

Herein, in the example in FIG. 9, it is configured such that two broadcasting services are broadcast by time division in the central segment of the third physical channel, and a service list of the two broadcasting services is stated in the NIT for the central segment of the third physical channel.

Also, the existing receiving terminal acquires, from the TS in the central segment of the second physical channel, an NIT containing the network ID, tuning information, additional information descriptor, etc. of the 1seg broadcasting assigned to that central segment.

Additionally, the existing receiving terminal associates and registers the tuning information indicating the frequency "F1", the service ID "S1" from the service list, and the service type "Data" included in the NIT for the central segment of the first physical channel in a channel selection table. Also, the existing receiving terminal also registers the service name "BASIC1 CHANNEL" included in the SDT for the central segment of the first physical channel in the channel selection table in association with the above information.

Similarly, the existing receiving terminal registers the tuning information indicating the frequency "F3" of the central segment of the third physical channel, as well as the service ID "S3" of the first broadcasting service, the service type "Data", and the service name "BASIC2 CHANNEL", in the channel selection table. Also, the existing receiving terminal registers tuning information indicating the frequency "F3" of the central segment of the third physical channel, as well as the service ID "S4" of the second broadcasting service, the service type "Audio", and the service name "MUSIC CHANNEL", in the channel selection table.

Meanwhile, the existing receiving terminal ignores the additional information descriptor included in the NIT for the central segment of the second physical channel. Consequently, the existing receiving terminal cannot acquire channel selection information for the pay community broadcasting assigned to the central segment of the second physical channel. Thus, channel selection information for pay community broadcasting is not registered in the channel selection table. In other words, in an existing receiving terminal, only channel selection information for viewable, free 1seg broadcasting is recognized and registered in a channel selection table.

In contrast, as illustrated in FIG. 10, the receiving terminal 33 analyzes the additional information descriptor included in the NIT for the central segment of the second physical channel. In so doing, the receiving terminal 33 is able to recognize a packet ID for a PCR packet stated in the additional information descriptor, and acquire a PCR packet containing channel selection information for pay community broadcasting on the basis of that packet ID. Consequently, the receiving terminal 33 is able to register the tuning information, service ID, service type, service name, etc. included in the channel selection information in a channel selection table. In other words, in the receiving terminal 33, channel selection information for viewable, free 1seg broadcasting and pay community broadcasting is recognized and registered in a channel selection table.

More specifically, the receiving terminal 33 associates and registers tuning information indicating the frequency "F2" included in the channel selection information, as well as the service ID "S2", the service type "Data", and the service name "PREMIUM CHANNEL" included in the pay service list, in a channel selection table. Also, the receiving terminal 33 registers the PMT packet ID "xxx" included in the pay service list as extension information (Extension) and the registration type and URL "http://xxx" as registration information in the channel selection information in association with the above information.

[Explanation of Channel Selection Table Creation Process by Receiving Terminal]

Figure 11:
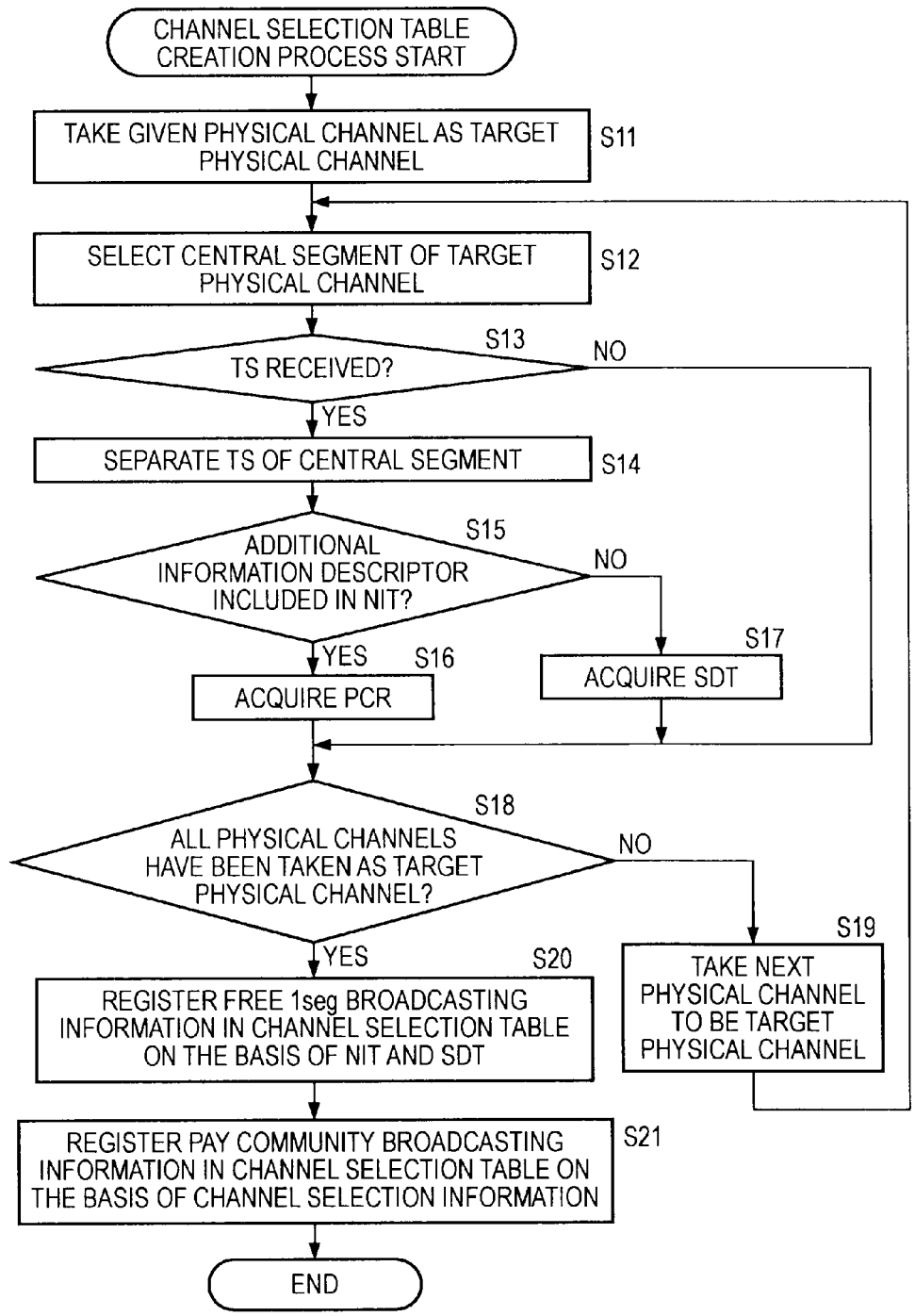
FIG. 11 is a flowchart of a channel selection table creation process by a receiving terminal.

FIG. 11 is a flowchart of a channel selection table creation process by the receiving terminal 33. This channel selection table creation process is initiated when acquisition of a channel selection table is instructed by a user, for example.

In a step S11, the controller 64 of the receiving terminal 33 (FIG. 4) takes a given physical channel (the physical channel with the lowest frequency, for example) to be a target physical channel targeted for processing. Then, the controller 64 supplies the frequency of the central segment of the target physical channel to the tuner 52 as channel selection information.

In a step S12, the tuner 52 selects the central segment of the target physical channel on the basis of channel selection information from the controller 64.

In a step S13, the tuner 52 determines whether or not a TS in the central segment of the target physical channel has been received. In the case where a TS has been received, the process proceeds to a step S14.

In step S14, the demultiplexer 54 separates the TS in the central segment of the target physical channel that was received by the tuner 52 and supplied via the descrambler 53. Then, the demultiplexer 54 supplies the separated, respective information of the PSI to the controller 64 and the CAS processor 62.

In a step S15, the CAS processor 62 determines whether or not an additional information descriptor is included in an NIT supplied from the demultiplexer 54. In the case where it is determined in step S15 that an additional information descriptor is included, the CAS processor 62 analyzes the additional information descriptor and recognizes the packet ID of a PCR packet included in that additional information descriptor. Then, in a step S16, the CAS processor 62 acquires a PCR packet containing channel selection information for pay community broadcasting on the basis of that packet ID from among PCR packets supplied from the demultiplexer 54, and the process proceeds to a step S18.

In contrast, in the case where it is determined in step S13 that a TS in the central segment of the target physical channel has not been received, the process proceeds to step S18.

Also, in the case where it is determined in step S15 that an additional information descriptor is not included, the controller 64 acquires an SDT corresponding to an NIT supplied from the demultiplexer 54, and the process proceeds to step S18.

In step S18, the controller 64 determines whether or not all physical channel have been taken as the target physical channel. In the case where it is determined in step S18 that not all physical channels have been taken as the target physical channel, in a step S19 the controller 64 takes the next physical channel (the physical channel with the next highest frequency, for example) as the target physical channel, and the process returns to step S12. Then, the processing from step S12 to S19 is repeated until all physical channel have been taken as the target physical channel.

In contrast, in the case where it is determined in step S18 that all physical channels have been taken as the target physical channel, the process proceeds to a step S20. In step S20, the controller 64 registers information for free 1seg broadcasting such as tuning information, a service ID, a service type, a service name, etc. in the channel selection table on the basis of the NIT and SDT acquired from the demultiplexer 54.

In a step S21, the CAS processor 62 registers information for pay community broadcasting such as tuning information, a service ID, a service type, a service name, a PMT packet ID, registration information, etc. in the channel selection table on the basis of the channel selection information included in the PCR packet. Then the process ends.

[Explanation of Viewing Target Selection Instruction Methods]

Figure 12:
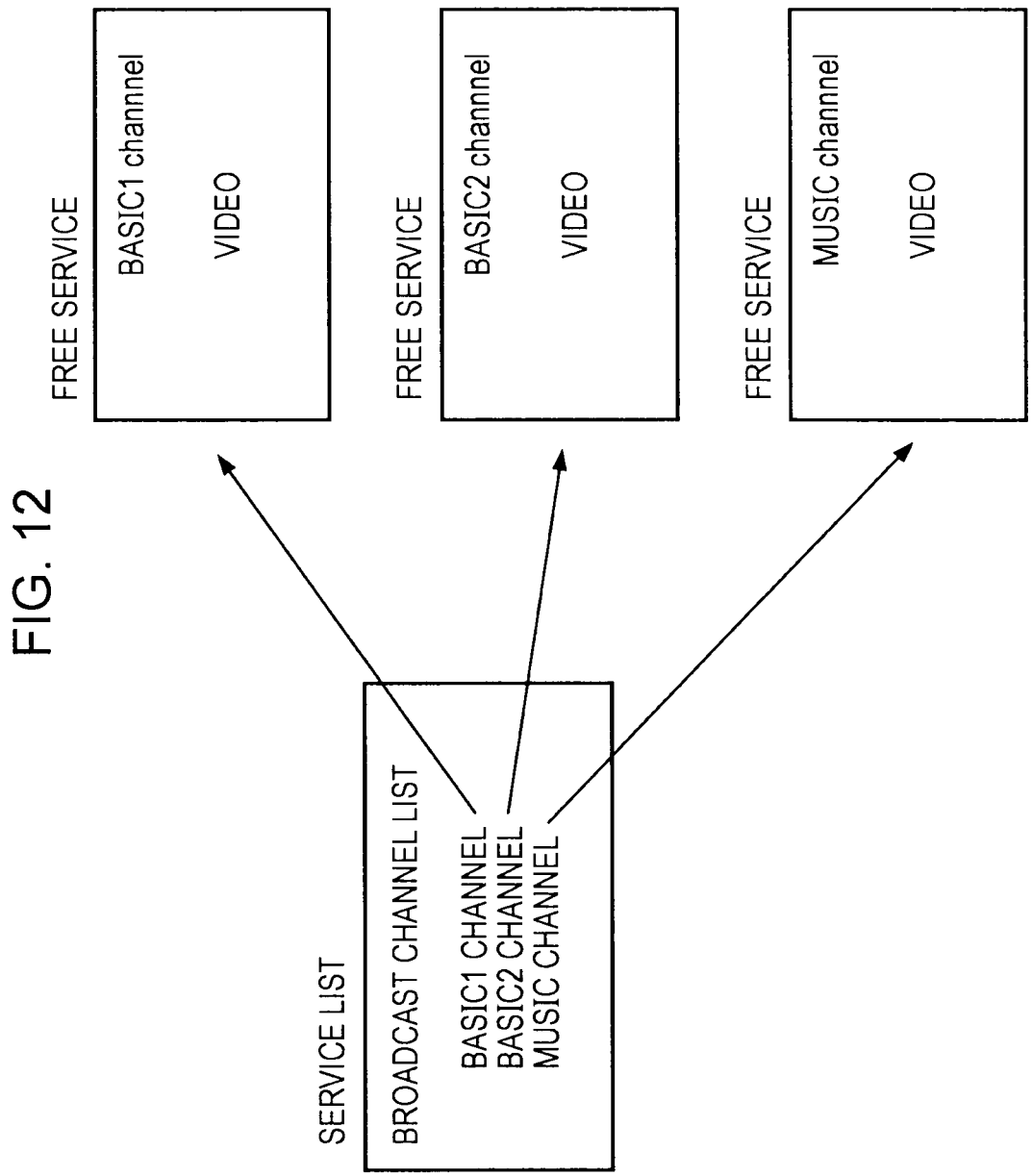
FIG. 12 is a diagram explaining a viewing target selection instruction method.
Figure 13:
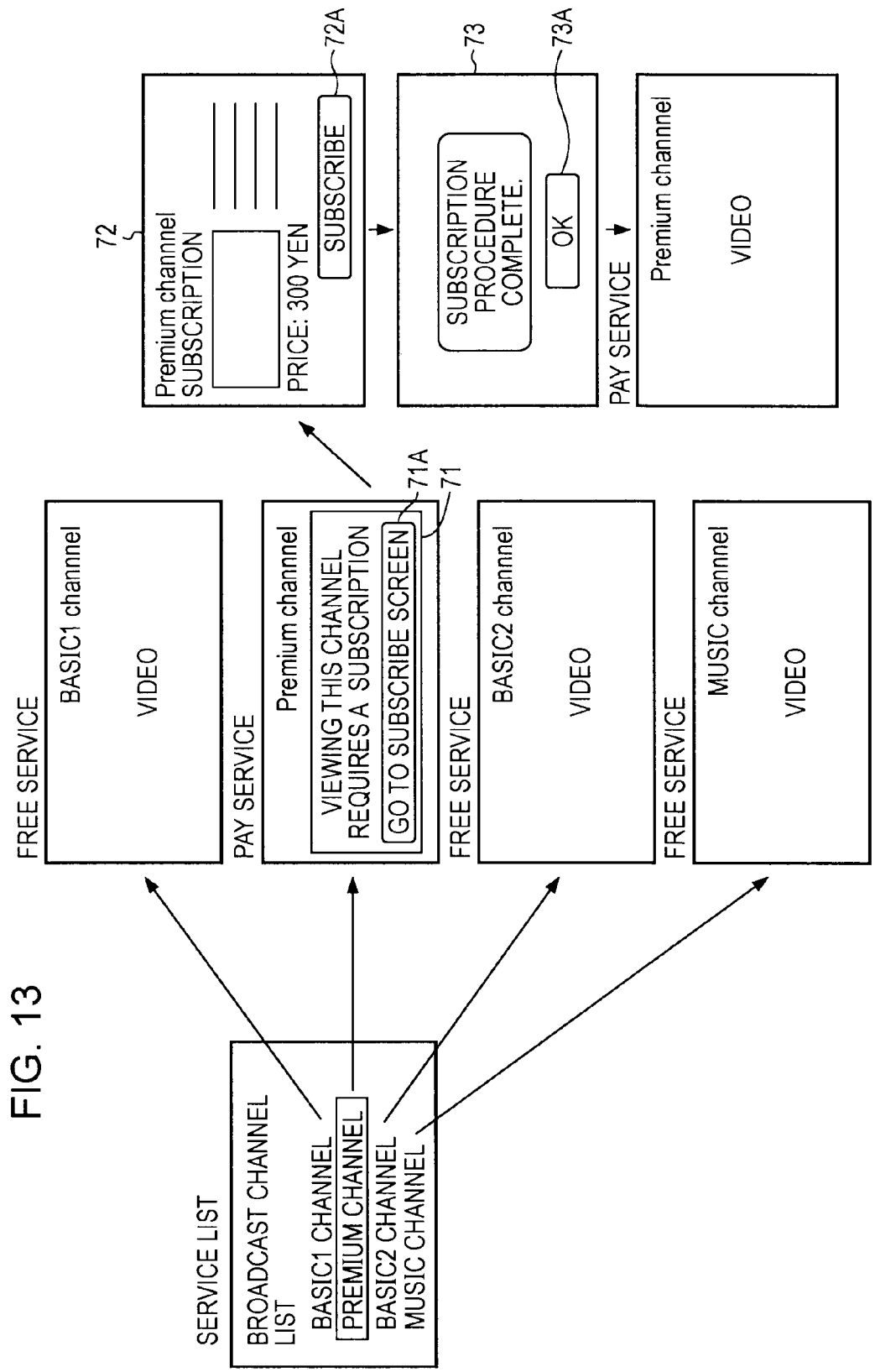
FIG. 13 is a diagram explaining another viewing target selection instruction method.

FIGS. 12 and 13 are diagrams explaining viewing target selection instruction methods by the user of the receiving terminal 33.

In the case where the user of the receiving terminal 33 issues instructions selecting a broadcasting service as a viewing target, first the user instructs display of a service list. In so doing, a service list like that illustrated in FIG. 12 is displayed in the case where a channel selection table registering only information on free 1seg broadcasting is stored in the storage unit 63 of the receiving terminal 33 as illustrated in FIG. 9, for example. More specifically, a service list is displayed in which the free 1seg broadcasting service names "BASIC1 CHANNEL", "BASIC2 CHANNEL", and "MUSIC CHANNEL" are listed.

In this case, scrambling is not applied to the video data and audio data of broadcasting services corresponding to any of the service names in the service list. Consequently, in the case where the user has issued instructions selecting one of the service names in the service list in FIG. 12, the receiving terminal 33 selects a channel on the basis of tuning information registered in the channel selection table in correspondence with that service name, and immediately outputs the video and audio of the viewing target broadcasting service.

In contrast, in the case where a channel selection table registering information on not only free 1seg broadcasting but also pay community broadcasting is stored in the storage unit 63 of the receiving terminal 33 as illustrated in FIG. 10, a service list like that illustrated in FIG. 13 is displayed. More specifically, a service list is displayed in which the free 1seg broadcasting service names "BASIC1 CHANNEL", BASIC2 CHANNEL", and "MUSIC CHANNEL" as well as the pay community broadcasting service name "PREMIUM CHANNEL" are listed. Herein, in the example in FIG. 13, the registration type of the pay community broadcasting with the service name "PREMIUM CHANNEL" is taken to be the first type.

In this case, if the user issues instructions selecting the service name "PREMIUM CHANNEL" from the service list in FIG. 13, the receiving terminal 33 acquires an HTML or BML document for a subscribe screen 71 from the server 35. In so doing, a subscribe screen 71 consisting of the message "Subscription is required to view this channel" and a "Go to Subscribe screen" button 71A is displayed.

If the user selects the "Go to Subscribe screen" button 71A of the subscribe screen 71, the receiving terminal 33 acquires an HTML or BML document for a subscribe screen 72 from the server 35, and displays the subscribe screen 72. On this subscribe screen 72 are displayed a "Subscribe" button 72A and a pay community broadcasting fee, etc.

If the user selects the "Subscribe" button 72A, the receiving terminal 33 causes the server 35 to conduct a payment process, and acquires an HTML or BML document for a subscription complete screen 73 transmitted from the server 35 after the payment process ends. In so doing, a subscription complete screen 73 containing the message "Subscription procedure complete." and an OK button 73A is displayed. Then, if the OK button 73A is selected by the user, the receiving terminal 33 acquires a viewing license from the server 35.

In so doing, it becomes possible for the receiving terminal 33 to use a scramble key included in the viewing license to unlock the scrambling applied to pay community broadcasting. Consequently, the receiving terminal 33 selects the pay community broadcasting with the service name "PREMIUM CHANNEL" on the basis of the channel selection table, unlocks the scrambling using the scramble key, and outputs the video and audio of the community broadcast.

Herein, in the explanation discussed above, the registration type of the pay community broadcasting with the service name "PREMIUM CHANNEL" was taken to be the first type, but in the case of the second type, the subscribe screens 71 and 72 as well as the subscription complete screen 73 are not displayed. In this case, if the user selects the service name "PREMIUM CHANNEL", the receiving terminal 33 displays a "Subscribe" button, etc. Then, if the "Subscribe" button is selected by the user, the receiving terminal 33 causes the server 35 to conduct a payment process and transmit and viewing license.

[Detailed Exemplary Configuration of Server]

Figures 14, 15:
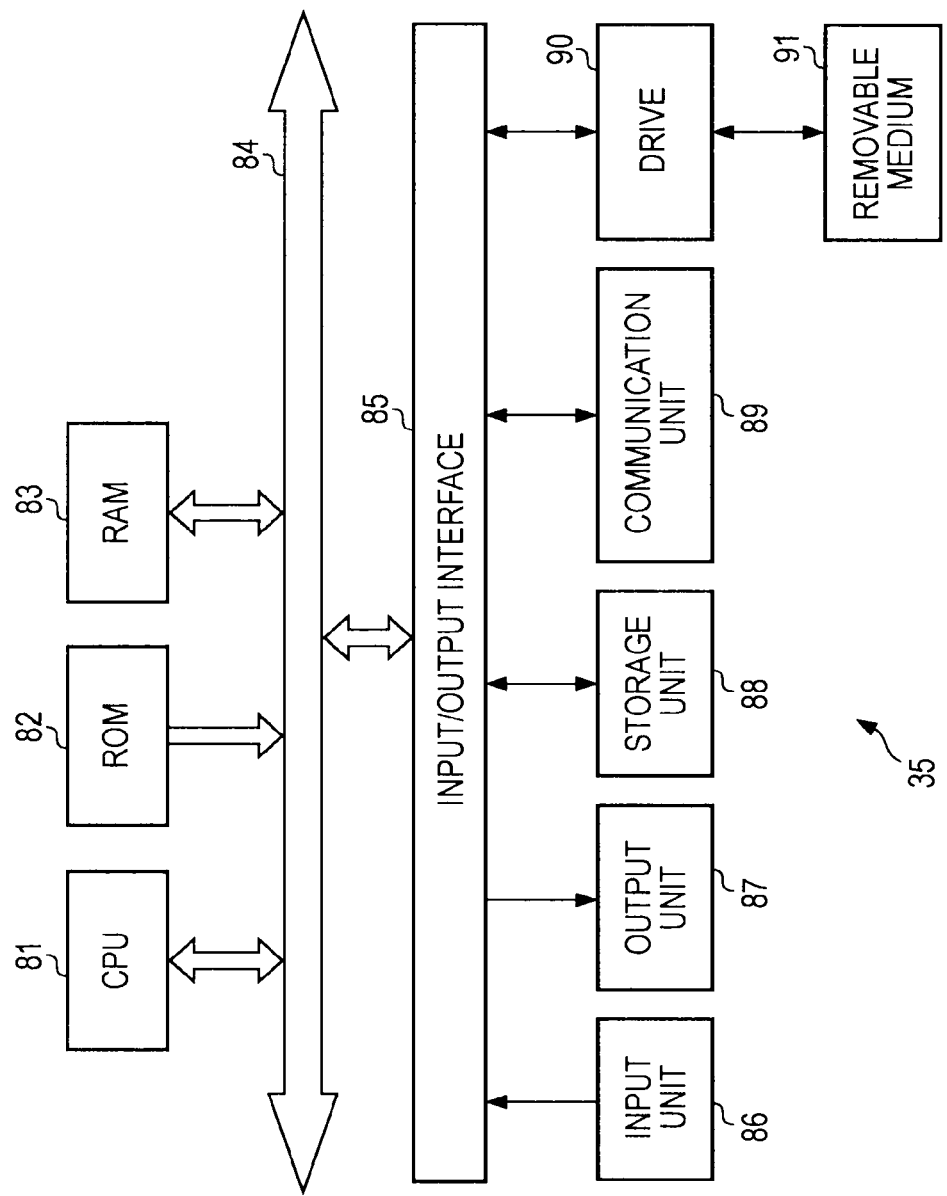
FIG. 14 is a block diagram illustrating a detailed exemplary configuration of the server in FIG. 2.
FIG. 15 is a diagram illustrating an exemplary configuration of a viewing license.

FIG. 14 is a block diagram illustrating a detailed exemplary configuration of the server 35 in FIG. 2.

In the server 35 in FIG. 14, a CPU (Central Processing Unit) 81, ROM (Read Only Memory) 82, and RAM (Random Access Memory) 83 are connected to each other by a bus 84.

An input/output interface 85 is additionally connected to the bus 84. Connected to the input/output interface 85 are an input unit 86, an output unit 87, a storage unit 88, a communication unit 89, and a drive 90.

The input unit 86 comprises a keyboard, mouse, microphone, etc. The output unit 87 comprises a display, speakers, etc. The storage unit 88 comprises a hard disk, non-volatile memory, etc. The communication unit 89 comprises a network interface, etc. The drive 90 drives a removable medium 91 such as a magnetic disk, an optical disc, a magneto-optical disc, or semiconductor memory.

In the server 35 configured as above, various processes are conducted due to the CPU 81 loading a program stored in the storage unit 88 into the RAM 83 via the input/output interface 85 and the bus 84, and executing the program, for example.

More specifically, the CPU 81 conducts an authentication process with respect to the receiving terminal 33 on the basis of a terminal ID received from the receiving terminal 33 via the communication unit 89. Also, the CPU 81, on the basis of the results from the authentication process and a request from the receiving terminal 33, controls the communication unit 89 to transmit an HTML or BML document for the subscribe screen 71 or 72 stored in the storage unit 88 to the receiving terminal 33.

Additionally, the CPU 81 conducts a payment process with respect to a receiving terminal 33 in response to a request from that receiving terminal 33. Then, the CPU 81 controls the communication unit 89 to transmit an HTML or BML document for the subscription complete screen 73 stored in the storage unit 88 to the receiving terminal 33. The CPU 81, in response to a request from the receiving terminal 33, controls the communication unit 89 to transmit a pay community broadcasting viewing license stored in the storage unit 88 to the receiving terminal 33.

Also, the CPU 81, on the basis of the results from the authentication process, conducts a payment process with respect to the receiving terminal 33 and controls the communication unit 89 to transmit a pay community broadcasting viewing license stored in the storage unit 88 to the receiving terminal 33.

Herein, a program executed by the CPU 81 may for example be provided by being recorded onto a removable medium 91 as packaged media, etc. Also, a program may be provided via a wired or wireless transmission medium such as a local area network, the Internet, or digital satellite broadcasting.

Also, in the server 35, a program may be installed onto the storage unit 88 via the input/output interface 85 due to the removable medium 91 being loaded into the drive 90. Furthermore, a program may be received by the communication unit 89 via a wired or wireless transmission medium and installed onto the storage unit 88. Otherwise, a program may be installed in advance in the ROM 82 or the storage unit 88.

[Explanation of Viewing License]

FIG. 15 is a diagram illustrating an exemplary configuration of a viewing license.

The viewing license in FIG. 15 is composed of a license ID which is an ID unique to a viewing license, a license expiration date which is the expiration date for a viewing license, and a scramble key.

Figure 16:
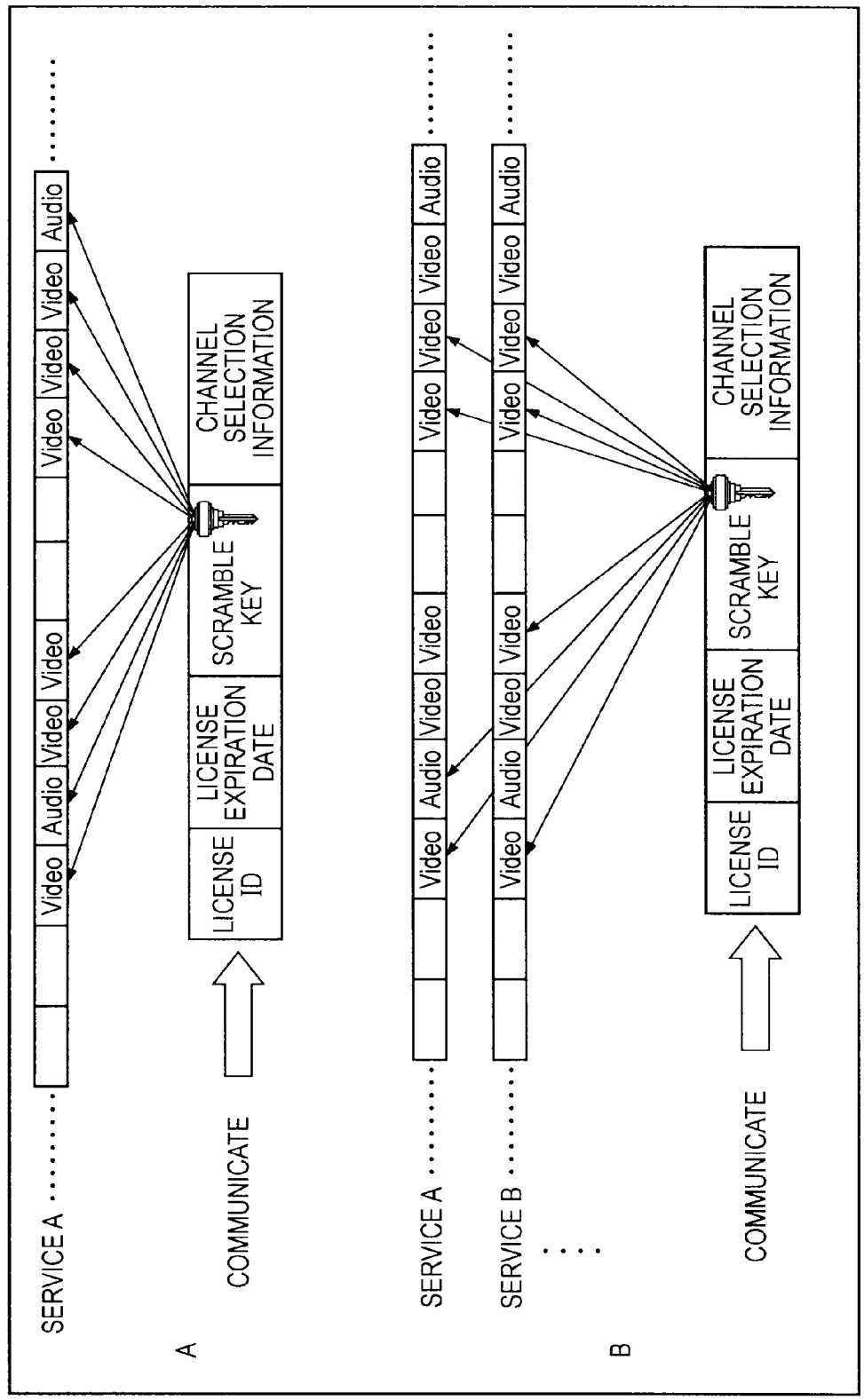
FIG. 16 is a diagram explaining a scramble key included in a viewing license.

FIG. 16 is a diagram explaining a scramble key included in a viewing license.

For a scramble key included in a viewing license, one key may be set for one broadcasting service in pay community broadcasting, as illustrated by A in FIG. 16, or one key may be set for a plurality of broadcasting services, as illustrated by B in FIG. 16. In the case where one scramble key is set for one broadcasting service, a payment process is conducted in units of single broadcasting services, while in the case where one scramble key is set for a plurality of broadcasting services, a payment process is conducted in units of plural broadcasting services.

Also, it may be configured such that a scramble key is set for a broadcasting service in units of hours, days, or months of pay community broadcasting. In this case, a payment process is conducted in units of hours, days, or months.

[Explanation of Viewing License Acquisition Process by Transmitting/Receiving System]

Figure 17:
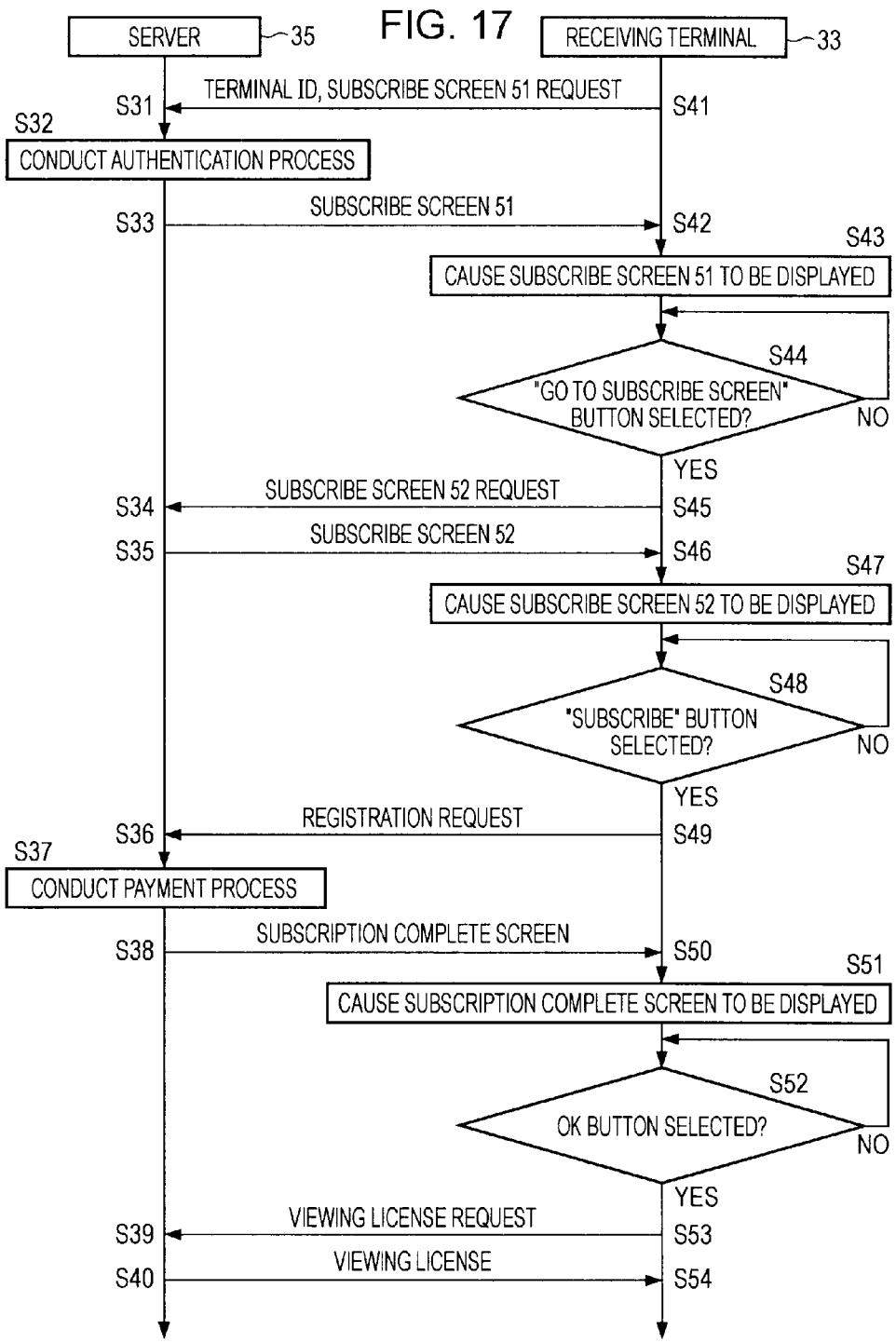
FIG. 17 is a flowchart explaining a viewing license acquisition process.

FIG. 17 is a flowchart explaining a viewing license acquisition process in the transmitting/receiving system 30. This viewing license acquisition process is initiated when the user of the receiving terminal 33 issues instructions selecting the service name of pay community broadcasting listed in a service list as a viewing target service name, for example. Herein, in FIG. 17, the registration type of the viewing target pay community broadcasting is taken to be the first type.

In a step S41 in FIG. 17, the CAS processor 62 of the receiving terminal 33 (FIG. 4) transmits a terminal ID stored in the storage unit 63 and a request for a subscribe screen 71 to the server 35 via the network 34.

More specifically, the CAS processor 62, on the basis of the packet ID for a PCR packet in the extended information registered in a channel selection table as information corresponding to the viewing target pay community broadcast, acquires channel selection information for the viewing target from the PCR packet specified by that packet ID. Then, the CAS processor 62 supplies the URL included in the registration information of that channel selection information to the wireless communication interface 61 together with the terminal ID and the subscribe screen 71 request. The wireless communication interface 61, on the basis of the URL supplied from the CAS processor 62, transmits the terminal ID and the subscribe screen 71 request to the server 35 corresponding to that URL.

In a step S31, the communication unit 89 of the server 35 (FIG. 14) receives the terminal ID and subscribe screen 71 request transmitted from the receiving terminal 33 via the network 34, and supplies them to the CPU 81. In a step S32, the CPU 81, on the basis of the terminal ID supplied from the communication unit 89, conducts an authentication process to determine whether or not the receiving terminal 33 corresponding to that terminal ID is a valid receiving terminal to which pay community broadcasting can be provided.

In the case where it is determined that the receiving terminal 33 is a valid receiving terminal, in a step S33 the CPU 81 reads out an HTML or BML document for a subscribe screen 71 stored in the storage unit 88, and controls the communication unit 89 to transmit it to the receiving terminal 33. In contrast, in the case where it is determined that the receiving terminal 33 is not a valid receiving terminal, the process ends.

In a step S42, the wireless communication interface 61 of the receiving terminal 33 receives the HTML or BML document for a subscribe screen 71 transmitted from the server 35, and supplies it to the browser 60.

In a step S43, the browser 60 causes the display unit 57 to display a subscribe screen 71. More specifically, the browser 60 interprets the HTML or BML document for a subscribe screen 71 supplied from the wireless communication interface 61, and generates video data for a subscribe screen 71. Then, the browser 60 supplies that video data to the display unit 57 via the selector 56 and causes the display unit 57 to display a subscribe screen 71.

In a step S44, the CAS processor 62 determines whether or not a "Go to Subscribe screen" button 71A on the subscribe screen 71 has been selected by the user. In the case where it is determined in step S44 that the "Go to Subscribe screen" button 71A has not been selected, the CAS processor 62 stands by until the "Go to Subscribe screen" button 71A is selected.

In contrast, in the case where it is determined in step S44 that the "Go to Subscribe screen" button 71A has been selected, the process proceeds to a step S45. In step S45, the CAS processor 62 transmits a request for a subscribe screen 72 to the server 35 via the network 34 by supplying that request to the wireless communication interface 61.

In a step S34, the communication unit 89 of the server 35 receives the request for a subscribe screen 72 transmitted from the receiving terminal 33 via the network 34 and supplies it to the CPU 81. In a step S35, the CPU 81 reads out an HTML or BML document for a subscribe screen 72 stored in the storage unit 88, and controls the communication unit 89 to transmit it to the receiving terminal 33.

In a step S46, the wireless communication interface 61 of the receiving terminal 33 receives the HTML or BML document for a subscribe screen 72 transmitted from the server 35, and supplies it to the browser 60.

In a step S47, the browser 60 causes the display unit 57 to display a subscribe screen 72 on the basis of the HTML or BML document for a subscribe screen 72 supplied from the wireless communication interface 61. In a step S48, the CAS processor 62 determines whether or not a "Subscribe" button 72A on the subscribe screen 72 has been selected by the user. In the case where it is determined in step S48 that the "Subscribe" button 72A has not been selected, the CAS processor 62 stands by until the "Subscribe" button 72A is selected.

In contrast, in the case where it is determined in step S48 that the "Subscribe" button 72A has been selected, the process proceeds to a step S49. In step S49, the CAS processor 62 transmits a registration request to the server 35 via the network 34 by supplying that registration request to the wireless communication interface 61.

In a step S36, the communication unit 89 of the server 35 receives the registration request transmitted from the receiving terminal 33 via the network 34, and supplies it to the CPU 81. In a step S37, the CPU 81 conducts a payment process with respect to the receiving terminal 33 for the viewing target pay community broadcasting. In a step S38, the CPU 81 reads out an HTML or BML document for a subscription complete screen 73 stored in the storage unit 88, and controls the communication unit 89 to transmit it to the receiving terminal 33.

In a step S50, the wireless communication interface 61 of the receiving terminal 33 receives an HTML or BML document for a subscription complete screen 73 transmitted from the server 35 and supplies it to the browser 60. In a step S51, the browser 60 causes the display unit 57 to display a subscription complete screen 73 on the basis of the HTML or BML document for a subscription complete screen 73 supplied from the wireless communication interface 61.

In a step S52, the CAS processor 62 determines whether or not an OK button 73A on the subscription complete screen 73 has been selected by the user. In the case where it is determined in step S52 that the OK button 73A has not been selected, the CAS processor 62 stands by until the OK button 73A is selected.

In contrast, in the case where it is determined in step S52 that the OK button 73A has been selected, the process proceeds to a step S53. In step S53, the CAS processor 62 transmits a request for a viewing license to the server 35 via the network 34 by supplying that request to the wireless communication interface 61.

In a step S39, the communication unit 89 of the server 35 receives a request for a viewing license transmitted from the receiving terminal 33 via the network 34, and supplies it to the CPU 81. In a step S40, the CPU 81 reads out a viewing license for the viewing target from the storage unit 88, and controls the communication unit 89 to transmit that viewing license to the receiving terminal 33.

In a step S54, the wireless communication interface 61 of the receiving terminal 33 receives the viewing license transmitted from the server 35 and supplies it to the CAS processor 62. The viewing license is made to be stored in the storage unit 63. Then, the process ends.

As above, in a transmitting/receiving system 30, since the minimum functions of a server 35 required for a licensing format are authentication functions, viewing license transmission functions, and payment functions, the server 35 can be realized at low cost.

[Explanation of Pay Community Broadcasting Channel Selection Process by Receiving Terminal]

Figure 18:
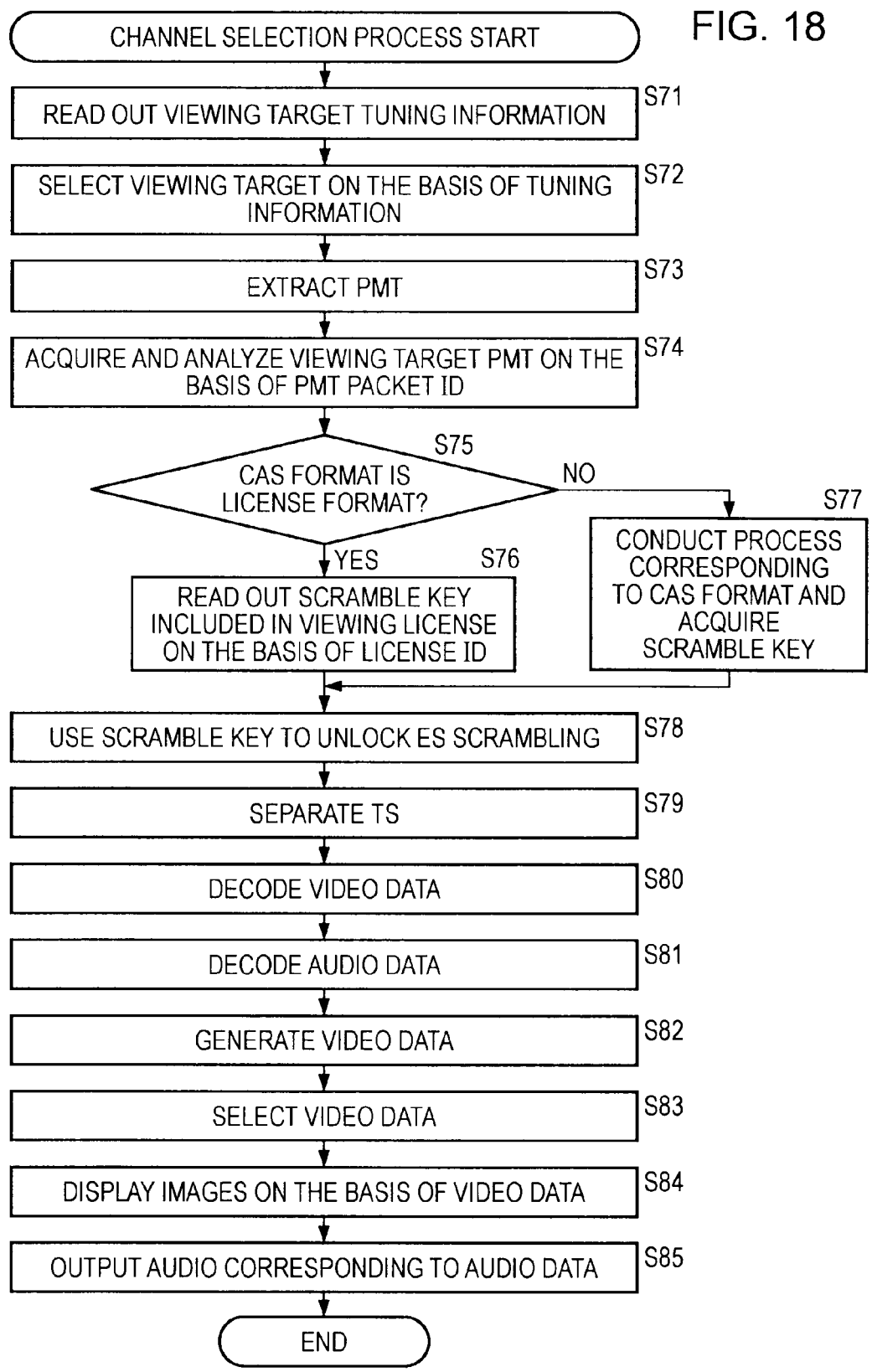
FIG. 18 is a flowchart explaining a pay community broadcasting channel selection process.

FIG. 18 is a flowchart explaining a pay community broadcasting channel selection process. This channel selection process is initiated when the viewing license acquisition process in FIG. 17 ends, for example.

In a step S71 in FIG. 18, the controller 64 reads out from the storage unit 63 tuning information registered in a channel selection table in association with the service name selected by the user as tuning information for the viewing target, and supplies it to the tuner 52.

In a step S72, the tuner 52 selects the viewing target pay community broadcasting on the basis of a frequency indicating by the tuning information supplied from the controller 64. In so doing, the supply of the TS of the viewing target to the demultiplexer 54 via the descrambler 53 is initiated.

In a step S73, the demultiplexer 54 separates the TS supplied from the tuner 52 via the descrambler 53 and extracts a PMT. The demultiplexer 54 supplies that PMT to the CAS processor 62 and the controller 64.

In a step S74, the CAS processor 62, on the basis of the packet ID for the viewing target PMT registered in the channel selection table, acquires and analyzes the viewing target PMT from the PMT supplied from the demultiplexer 54.

In a step S75, the CAS processor 62 determines whether or not the CAS format stated in the limited reception descriptor of the viewing target PMT is a licensing format.

In the case where it is determined in step S75 that the CAS format is a licensing format, the process proceeds to a step S76.

In step S76, the CAS processor 62, on the basis of a license ID stated in the private data area of the viewing target PMT, reads out a scramble key included in the viewing license corresponding to that license ID from the storage unit 63. The scramble key included in a viewing license acquired in advance via the network 34 is stored in the storage unit 63.

Then, the CAS processor 62 supplies that scramble key and the packet IDs of the ESs stated in the viewing target PMT to the descrambler 53, and advances the process to a step S78.

In contrast, in the case where it is determined in step S75 that the CAS format is not a licensing format, in step S77 the CAS processor 62 conducts processing corresponding to that CAS format and acquires a scramble key. Then, the CAS processor 62 supplies that scramble key and the packet IDs of the ESs stated in the viewing target PMT to the descrambler 53, and advances the process to step S78.

In step S78, the descrambler 53 uses the scramble key supplied from the CAS processor 62 to unlock the scrambling of the ESs corresponding to the packet ID supplied from the CAS processor 62. In so doing, the scrambling applied to the video data and audio data of the viewing target TS is unlocked. The descrambled TS is supplied to the demultiplexer 54.

In a step S79, the demultiplexer 54 separates the TS supplied from the descrambler 53 into video data, audio data, display control information, and the respective information, etc. of the PSI. The demultiplexer 54 supplies the video data to the video decoder 55 and supplies the audio data to the audio decoder 58. Also, the audio decoder 58 supplies the display control information to the browser 60, and supplies the respective information, etc. of the PSI to the controller 64 and the CAS processor 62.

In a step S80, the video decoder 55, following control by the controller 64, decodes the video data supplied from the demultiplexer 54 in a format corresponding to the encoding at the community broadcasting station 32, and supplies the result to the selector 56.

In a step S81, the audio decoder 58, following control by the controller 64, decodes the audio data supplied from the demultiplexer 54 in a format corresponding to the encoding at the community broadcasting station 32, and supplies the result to the speakers 59.

In a step S82, the browser 60 interprets the display control information supplied from the demultiplexer 54, generates video data, and supplies it to the selector 56.

In a step S83, the selector 56, following control by the controller 64, selects the video data supplied from the video decoder 55 or the video data supplied from the browser 60, and supplies it to the display unit 57.

In a step S84, the display unit 57 displays pay community broadcasting images of the viewing target on the basis of the video data supplied from the selector 56.

In a step S85, the speakers 59 output audio corresponding to the audio data supplied from the audio decoder 58 as pay community broadcasting audio of the viewing target. Then, the process ends.

As above, in a transmitting/receiving system 30, the functions of a receiving terminal 33 additionally required for a licensing format are basically just the functions of the CAS processor 62. Consequently, the development cost of a receiving terminal 33 for a licensing format can be kept low. Also, in the case where the functions of the CAS processor 62 are realized by a CPU, etc. that realizes other functions, it is not necessary to add new hardware for a licensing format.

Herein, in the present embodiment, the channel selection information for pay community broadcasting is taken to be provided to the receiving terminal 33 by being disposed in a PCR packet, but it may also be configured such that channel selection information is provided from another apparatus such as the server 35. In this case, the receiving terminal 33 acquires a PCR packet by communicating with an apparatus specified by a URL included in an additional information descriptor. Also, a case where channel selection information is included in a PCR packet is described by way of example, but it may also be configured such that channel selection information is transmitted not with a PCR packet, but with a packet whose PID differs from an NIT packet. However, since significant data has not traditionally been sent in the payload of a PCR packet, the case of inserting channel selection information into the payload of a PCR packet and transmitting can prevent an increase in the number of packets.

Also, in the transmitting/receiving system 30 discussed above, although reception restriction was conducted using a licensing format for community broadcasting, it may also be configured such that reception restriction is conducted using a licensing format for other 1seg broadcasting. Furthermore, it may also be configured such that reception restriction is conducted only for a part of community broadcasting or other 1seg broadcasting.

Also, the series of processes of the receiving terminal 33 discussed earlier may be executed by hardware or executed by software. In the case of executing the series of processes by software, a program constituting such software is installed onto a computer. Herein, a computer includes a computer built into special-purpose hardware, or for example a general-purpose personal computer able to execute various functions by installed various programs thereon, etc.

Figure 19:
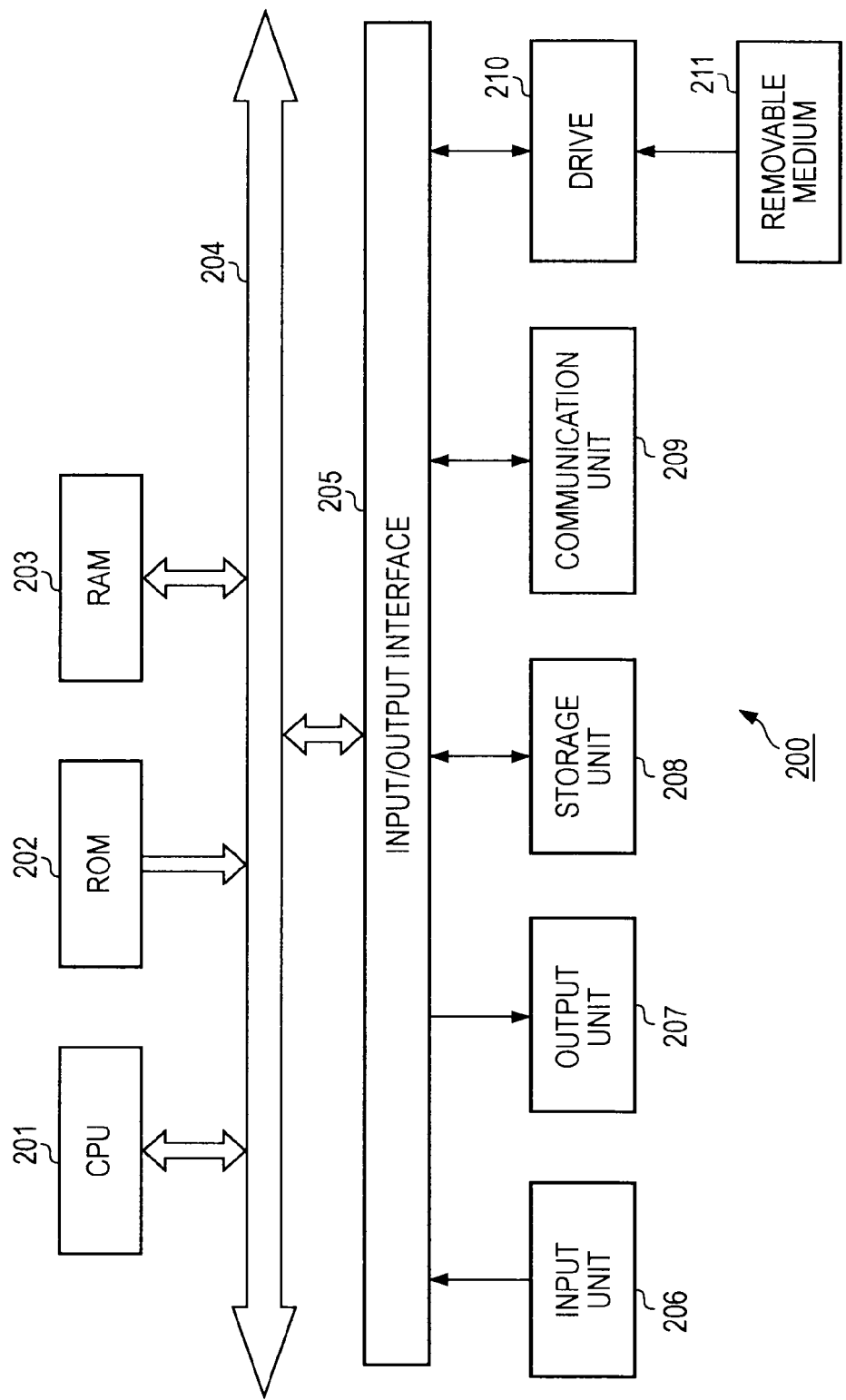
FIG. 19 is a block diagram illustrating an exemplary hardware configuration of a personal computer.

FIG. 19 is a block diagram illustrating an exemplary hardware configuration of a personal computer that executes the series of processes of the receiving terminal 33 discussed earlier by a program.

In a personal computer 200, a CPU 201, ROM 202, and RAM 203 are connected to each other by a bus 204.

An input/output interface 205 is additionally connected to the bus 204. Connected to the input/output interface 205 are an input unit 206, an output unit 207, a storage unit 208, a communication unit 209, and a drive 210.

The input unit 206 comprises a keyboard, mouse, microphone, etc. The output unit 207 comprises a display, speakers, etc. The storage unit 208 comprises a hard disk, non-volatile memory, etc. The communication unit 209 comprises a network interface, etc. The drive 210 drives a removable medium 211 such as a magnetic disk, an optical disc, a magneto-optical disc, or semiconductor memory.

In the personal computer 200 configured as above, the series of process discussed earlier are conducted due to the CPU 201 loading a program stored in the storage unit 208 into the RAM 203 via the input/output interface 205 and the bus 204, and executing the program, for example.

A program executed by the personal computer 200 (CPU 201) may for example be provided by being recorded onto a removable medium 211 as packaged media, etc. Also, a program may be provided via a wired or wireless transmission medium such as a local area network, the Internet, or digital satellite broadcasting.

In the personal computer 200, a program may be installed onto the storage unit 208 via the input/output interface 205 due to the removable medium 211 being loaded into the drive 210. Also, a program may be received by the communication unit 209 via a wired or wireless transmission medium and installed onto the storage unit 208. Otherwise, a program may be installed in advance in the ROM 202 or the storage unit 208.

Herein, in the present specification, the steps stating a program stored in a program recording medium may obviously include processes conducted in a time series following the described order, and may also include processes executed in parallel or individually without necessarily being processed in a time series.

Also, in the present specification, a system refers to the totality of an apparatus composed of a plurality of apparatus.

An embodiment of the present invention is not limited to the embodiments discussed above, and various modifications are possible within a scope that does not depart from the principal matter of the present invention.

REFERENCE SIGNS LIST 30 transmitting/receiving system
33 receiving terminal
35 server
52 tuner
53 descrambler
61 wireless communication interface
62 CAS processor
81 CPU
89 communication unit

The invention claimed is:

1. A transmitting apparatus, comprising:
generating means for generating, in a data structure for transmission in digital broadcasting, first channel selection information which is information related to tuning information of reception-unrestricted digital broadcasting, and identification information enabling procurement of second channel selection information which is information related to tuning information of reception-restricted digital broadcasting; and
transmitting means for transmitting digital broadcasting content, the channel selection information, and the identification information,
wherein the identification information enables procurement of the second channel selection information for the reception-restricted digital broadcasting from within the digital broadcasting.

2. The transmitting apparatus according to claim 1, wherein
the identification information is identification information for identifying the second channel selection information for the reception-restricted digital broadcasting stored in a given information processing apparatus.

3. The transmitting apparatus according to claim 1, wherein
the identification information is information indicating a packet where the second channel selection information for the reception-restricted digital broadcasting is located.

4. The transmitting apparatus according to claim 3, wherein
the transmitting means additionally transmits a clock reference information packet that includes the second channel selection information for the reception-restricted digital broadcasting, and
the identification information indicates a packet ID of the clock reference information.

5. A transmitting method, including:
a generating step wherein a transmitting apparatus generates, in a data structure for transmission in digital broadcasting, first channel selection information which is information related to tuning information of reception-unrestricted digital broadcasting, and identification information enabling procurement of second channel selection information which is information related to tuning information of reception-restricted digital; and a transmitting step wherein the transmitting apparatus transmits digital broadcasting content, the channel selection information, and the identification information, wherein the identification information enables procurement of the second channel selection information for the reception-restricted digital broadcasting from within the digital broadcasting.

6. A receiving apparatus, comprising:

receiving means for receiving digital broadcasting that includes first channel selection information which is information related to tuning information of reception-unrestricted digital broadcasting, identification information enabling procurement of second channel selection information which is information related to tuning information of reception-restricted digital broadcasting, and the content of the digital broadcasting;

channel selecting means for selecting the digital broadcasting; and controlling means for acquiring the second channel selection information for the reception-restricted digital broadcasting on the basis of the identification information, and controlling channel selection of the reception-restricted digital broadcasting on the basis of the second channel selection information, wherein the identification information enables procurement of the second channel selection information for the reception-restricted digital broadcasting from within the digital broadcasting.

7. The receiving apparatus according to claim 6, wherein the identification information is identification information for identifying the second channel selection information for the reception-restricted digital broadcasting stored in a given information processing apparatus, and the controlling means acquires the second channel selection information for the reception-restricted digital broadcasting from the given information processing apparatus on the basis of the identification information.

8. The receiving apparatus according to claim 6, further comprising:

acquiring means for acquiring a key for unlock scrambling applied to the content of the reception-restricted digital broadcasting; and unlocking means for using the key to unlock scrambling applied to the content of the reception-restricted digital broadcasting selected by the channel selecting means.

9. The receiving apparatus according to claim 6, wherein the identification information is information indicating a packet where the second channel selection information for the reception-restricted digital broadcasting is located.

10. The receiving apparatus according to claim 9, wherein the receiving means additionally receives a clock reference information packet that includes the second channel selection information for the reception-restricted digital broadcasting, and the identification information indicates a packet ID of the clock reference information.

11. A receiving method, including:

a receiving step wherein a receiving apparatus receives digital broadcasting that includes first channel selection information which is information related to tuning information of reception-unrestricted digital broadcasting, identification information enabling procurement of second channel selection information which is information related to tuning information of reception-restricted digital broadcasting, and the content of the digital broadcasting;

a channel selecting step wherein the receiving apparatus selects the digital broadcasting; and a controlling step wherein the receiving apparatus acquires the second channel selection information for the reception-restricted digital broadcasting on the basis of the identification information, and controls channel selection of the reception-restricted digital broadcasting on the basis of the second channel selection information, wherein the identification information enables procurement of the second channel selection information for the reception-restricted digital broadcasting from within the digital broadcasting.

12. The transmitting apparatus according to claim 4, wherein the clock reference information packet further includes a pay service list including a program map table ID (PMT_PID) in addition to the information related to tuning information of reception-restricted digital broadcasting.

13. The transmitting apparatus according to claim 12, wherein the digital broadcasting includes a network information table packet, a program map table packet and the clock reference information packet.

14. The transmitting apparatus according to claim 13, wherein the network information table packet does not include the pay service list.

15. The transmitting apparatus according to claim 13, wherein the pay service list further includes a service ID, a service type and service name, and registration information.

\* \* \* \* \*